US012190601B2

(12) United States Patent
Ko et al.

(10) Patent No.: US 12,190,601 B2
(45) Date of Patent: Jan. 7, 2025

(54) ADVANCED DRIVER ASSIST SYSTEM AND METHOD OF DETECTING OBJECT IN THE SAME

(71) Applicant: Samsung Electronics Co., Ltd., Suwon-si (KR)

(72) Inventors: Sangsoo Ko, Yongin-si (KR); Byeoungsu Kim, Hwaseong-si (KR); Kyoungyoung Kim, Suwon-si (KR); Sanghyuck Ha, Yongin-si (KR)

(73) Assignee: Samsung Electronics Co., Ltd. (KR)

( * ) Notice: Subject to any disclaimer, the term of this patent is extended or adjusted under 35 U.S.C. 154(b) by 0 days.

(21) Appl. No.: 18/443,980

(22) Filed: Feb. 16, 2024

(65) Prior Publication Data
US 2024/0193957 A1    Jun. 13, 2024

Related U.S. Application Data

(63) Continuation of application No. 18/319,094, filed on May 17, 2023, now Pat. No. 11,941,889, which is a (Continued)

(30) Foreign Application Priority Data

Jun. 9, 2020    (KR) .................. 10-2020-0069611

(51) Int. Cl.
*G06V 20/56*    (2022.01)
*B60W 50/00*    (2006.01)
(Continued)

(52) U.S. Cl.
CPC ............. *G06V 20/56* (2022.01); *B60W 50/00* (2013.01); *G06F 18/2148* (2023.01);
(Continued)

(58) Field of Classification Search
CPC ...... G06V 20/56; G06V 20/647; G06V 10/22; G06V 10/25; G06V 10/77; B60W 50/00;
(Continued)

(56) References Cited

U.S. PATENT DOCUMENTS

| 10,354,406 B2 | 7/2019 | Posner et al. |
| 10,565,468 B2 | 2/2020 | Schiffmann |

(Continued)

FOREIGN PATENT DOCUMENTS

| JP | 2014109795 A | 6/2014 |
| KR | 20180132922 A | 12/2018 |

*Primary Examiner* — Casey L Kretzer
(74) *Attorney, Agent, or Firm* — Myers Bigel, P.A.

(57) ABSTRACT

ADAS includes a processing circuit and a memory which stores instructions executable by the processing circuit. The processing circuit executes the instructions to cause the ADAS to receive, from a vehicle that is in motion, a video sequence, generate a position image including at least one object included in the stereo image, generate a second position information associated with the at least one object based on reflected signals received from the vehicle, determine regions each including at least a portion of the at least one object as candidate bounding boxes based on the stereo image and the position image, and selectively adjusting class scores of respective ones of the candidate bounding boxes associated with the at least one object based on whether a respective first position information of the respective ones of the candidate bounding boxes matches the second position information.

20 Claims, 27 Drawing Sheets

Related U.S. Application Data continuation of application No. 17/110,124, filed on Dec. 2, 2020, now Pat. No. 11,694,446.

(51) Int. Cl.
*G06F 18/214* (2023.01)
*G06F 18/241* (2023.01)
*G06V 10/22* (2022.01)
*G06V 10/25* (2022.01)
*G06V 10/77* (2022.01)
*G06V 20/64* (2022.01)
*H04N 13/111* (2018.01)

(52) U.S. Cl.
CPC ............ *G06F 18/241* (2023.01); *G06V 10/22* (2022.01); *G06V 10/25* (2022.01); *G06V 10/7715* (2022.01); *G06V 20/647* (2022.01); *H04N 13/111* (2018.05)

(58) Field of Classification Search
CPC .. G06F 18/2148; G06F 18/241; H04N 13/111
See application file for complete search history.

(56) References Cited

U.S. PATENT DOCUMENTS

| | | |
|---|---|---|
| 2015/0294571 A1 | 10/2015 | Shida et al. |
| 2018/0284260 A1 | 10/2018 | Oyaizu et al. |
| 2018/0348346 A1 | 12/2018 | Vallespi-Gonzalez et al. |
| 2018/0373942 A1 | 12/2018 | Noda et al. |
| 2019/0096086 A1 | 3/2019 | Xu et al. |
| 2019/0120955 A1 | 4/2019 | Zhong et al. |
| 2019/0258878 A1 | 8/2019 | Koivisto et al. |
| 2020/0361482 A1 | 11/2020 | Choi et al. |

FIG. 21

```
Algorithm: Select the proposal with highest confidence score
```

1. Procedure select proposal
2.     For i-class in all classes in the detector do
3.         For j-cell do
4.             For $k^{th}$ in radar object detection do
5.                 matching ($xyz_{i,j}^{vision}$, $xyz_{i,k}^{radar}$)
6.                 If match = true & $\lambda_{th\_low} < c_{ij} < \lambda_{th}$ then
7.                     $c_{ij} \leftarrow \frac{\lambda_{th} + \alpha}{\max(c_{ij})} \cdot c_{ij}$
8.                 Sorting $(b_j, c_{ij}) \in (B, C_i)$ as max n $c_{ij}$
9.                 Select n-sample $(B', C'_i)$ from $(B, C_i)$
10.               mask = $c_{ij} > \lambda_{th}$
11.               $(B', C'_i) = \text{mask}(B', C'_i)$
12.               NMS($B', C'_i$)
13. Return $B_{nms}$ from NMS for i-class

FIG. 25

| Algorithm: Select the proposal with highest confidence score |
|---|
| 1. Procedure select proposal |
| 2.     For i-class in all classes in the detector do |
| 3.         For j-cell do |
| 4.             For $k^{th}$ in radar object detection do |
| 5.                 matching ($xyz_{i,j}^{vision}$, $xyz_{i,k}^{radar}$) |
| 6.                 If match = true & $\lambda_{th\_low} < c_{ij} < \lambda_{th}$ then |
| 7.                     $c_{ij} \leftarrow \frac{\lambda_{th} + \alpha}{max(c_{ij})} \cdot c_{ij}$ # rescoring confidence |
| 8.                 If match = true & $c_{ij} > \lambda_{th}$ then |
| 9.                     $C_{cal} = C_{cal} \cup (xyz_{i,j}^{vision}, xyz_{i,k}^{radar})$ # gathering Calibration set |
| 10.                 Sorting$^{(b),c_{ij}) \in (B, C_i)}$ as max $n^{c_{ij}}$ |
| 11.                 Select n-sample$^{(B', C'_i)}$ from$^{(B, C_i)}$ |
| 12.                 mask = $c_{ij} > \lambda_{th}$ |
| 13.                 $(B', C'_i)$ = mask$^{(B', C'_i)}$ |
| 14.                 NMS(B', C'$_i$) |
| 15. Return $B_{nms}$ from NMS for i-class |

ADVANCED DRIVER ASSIST SYSTEM AND METHOD OF DETECTING OBJECT IN THE SAME

CROSS-REFERENCE TO RELATED APPLICATIONS

This US application is a continuation of U.S. patent application Ser. No. 18/319,094, filed May 17, 2023, which application is a continuation of U.S. patent application Ser. No. 17/110,124 filed Dec. 2, 2022, which application claims priority under 35 USC § 119 to Korean Patent Application No. 10-2020-0069611, filed on Jun. 9, 2020, in the Korean Intellectual Property Office (KIPO), the disclosure of each of which is incorporated in its entirety by reference herein.

BACKGROUND

1. Technical Field

Example embodiments relate generally to object detection, and more particularly to advanced driver assist system (ADAS) capable of detecting objects while driving vehicle and method of detecting object in the ADAS.

2. Discussion of the Related Art

ADAS is a system to assist or support a driver when driving a vehicle. The ADAS may include control assistance for keeping in lanes, blind spot warning functions, and an automatic emergency braking system. Object detection and scene segmentation using images are techniques used for supporting ADAS.

As techniques applied to vehicles have evolved, various schemes to recognize whether an event associated with driving vehicles have been developed.

SUMMARY

Some example embodiments are directed to providing an advanced driver assist system (ADAS) to detect objects, using signals from a plurality of sensors effectively.

Some example embodiments are directed to providing a method of detecting an object in ADAS capable of detecting objects by using signals from a plurality of sensors effectively.

According to example embodiments, an ADAS includes a processing circuit and a memory configured to store instructions executable by the processing circuit. The processing circuit executes the instructions to cause the ADAS to perform operations including receiving, from a vehicle that is in motion, a video sequence including a plurality of frames corresponding to a stereo image respectively, generating a position image based on the stereo image where the position image includes at least one object in the stereo image, generating a second position information associated with the at least one object based on reflected signals received from the vehicle that is in motion, determining regions that each include at least a portion of the at least one object, as candidate bounding boxes based on the stereo image and the position image, and selectively adjusting class scores of respective ones of the candidate bounding boxes associated with the at least one object based on whether a respective first position information of the respective ones of the candidate bounding boxes matches the second position information, and determining a risk to the vehicle based on the candidate bounding boxes and/or based on the class scores that were adjusted, and transmitting a notification message to a user device, wherein the notification message comprises information associated with the risk.

According to example embodiments, an ADAS includes a processing circuit and a memory which stores instructions executable by the processing circuit. The processing circuit includes a position information generation engine, a tracking list generation engine, an object detector, and an object tracking engine. The position information generation engine is configured to generate a position image based on a stereo image. The tracking list generation engine is configured to generate an object tracking list data including first position information and second position information based on reflected signals. The object detector is configured to output a final bounding box indicating at least one object based on the stereo image, the position image, and the second position information. The object tracking engine is configured to track the at least one object based on the final bounding box and the object tracking list data to generate an output signal. The object detector includes an object detection module, a score adjusting module and a selection engine. The object detection module is configured to generate candidate bounding boxes associated with the at least one object based on the stereo image and the position image. The score adjusting module is configured to selectively adjust class scores of ones of the candidate bounding boxes based on the first position information, the second position information, and a comparison of respective ones of the class scores with a threshold value to generate adjusted candidate bounding boxes including adjusted scores. The selection engine is configured to select an adjusted candidate bounding box whose adjusted score is greatest among the adjusted scores of the adjusted candidate bounding boxes as the final bounding box.

According to example embodiments, a method of detecting an object in an advanced driver assist system (ADAS) includes generating a position image including at least one object included in a stereo image, captured by a first sensor of a vehicle, based on a video sequence including a plurality of frames captured while the vehicle is in motion, and generating a second position information associated with the at least one object based on reflected signals received while the vehicle is in motion, wherein the second position is generated while the position image is generated. The method includes determining regions each including at least a portion of the at least one object as candidate bounding boxes based on the stereo image and the position image, selectively adjusting class scores of respective ones of the candidate bounding boxes associated with the at least one object based on whether a respective first position information of the respective ones of the candidate bounding boxes matches the second position information, and selecting a candidate bounding box whose selectively adjusted class score is greatest among the class scores of the candidate bounding boxes as a final bounding box.

Accordingly, the processing circuit in the ADAS may adjust selectively a class score of each of the candidate bounding boxes associated with the at least one object based on whether a first position information generated based on output of the camera matches a second position information generated based on output of the radar, and may select a candidate bounding box whose selectively adjusted class score is greatest among the candidate bounding boxes as a final bounding box. Therefore, the processing circuit in the ADAS may reduce a number of candidate bounding boxes which are not selected due to external factors.

BRIEF DESCRIPTION OF THE DRAWINGS

Illustrative, non-limiting example embodiments will be more clearly understood from the following detailed description in conjunction with the accompanying drawings.

FIG. 21 is an example of algorithm illustrating an operation of the score adjusting module according to example embodiments.

FIG. 25 is an example of an algorithm illustrating that the processing circuit of FIG. 24 calibrates ranges of the camera and the radar based on the class score.

DETAILED DESCRIPTION

Various example embodiments will be described more fully hereinafter with reference to the accompanying drawings, in which some example embodiments are shown.

Figure 1:
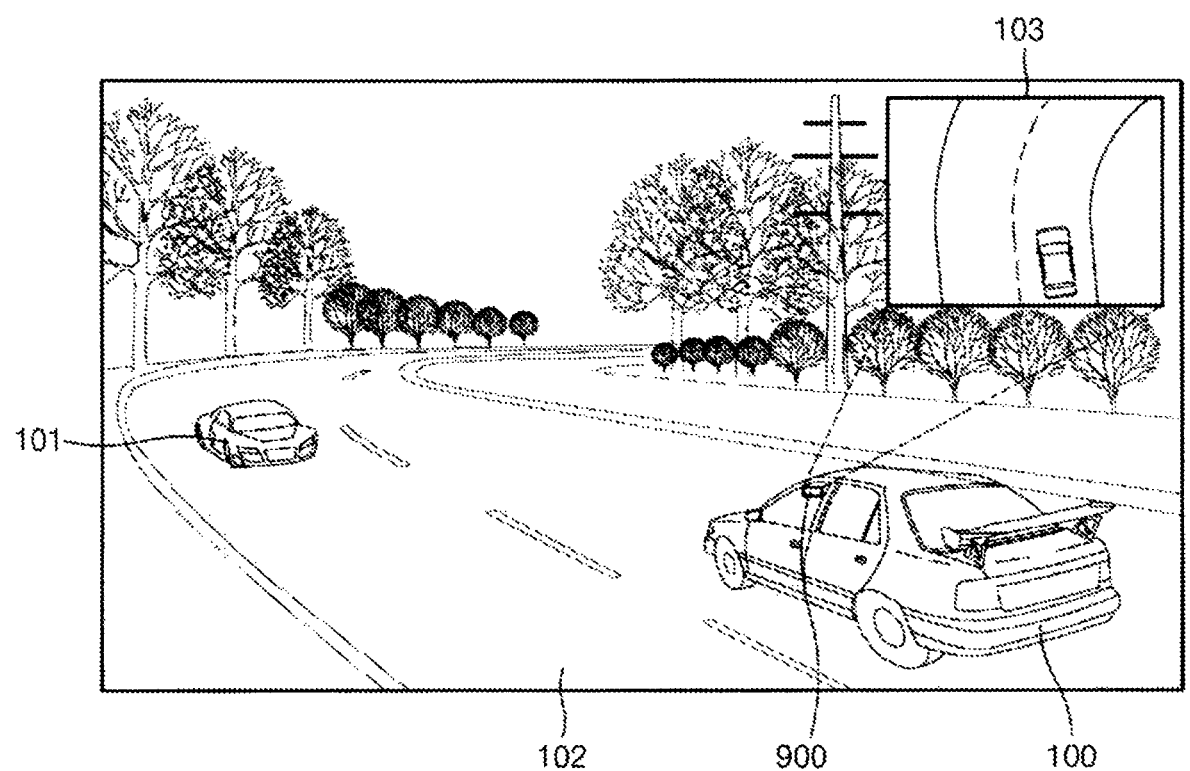
FIG. 1 illustrates an example in which an advanced driver assist system (ADAS) detects an object in front of a vehicle and determines whether an event occurs, according to example embodiments.

FIG. 1 illustrates an example in which an advanced driver assist system (ADAS) detects an object in front of a vehicle and determines whether an event occurs, according to example embodiments.

Referring to FIG. 1, an ADAS 900 may be a device mounted in a vehicle 100. The ADAS 900 may include various circuitry and components to receive a video sequence including a stereo image from a camera mounted in or on the vehicle 100 and reflected signals (reflected waves or reflected lights) from other sensors mounted in the vehicle 100 and determine occurrence of various events. The various events may include object detection, object tracking, and/or scene segmentation. The ADAS 900 may provide a notification message based on occurrence of events to a user.

While it is described that the ADAS 900 receives the video sequence from the camera mounted in the vehicle 100, it is not limited thereto. The ADAS 900 may receive the video sequence from a camera to capture a surrounding environment of the vehicle 100. The surrounding environment of the vehicle 100 may include, for example, a front side, lateral sides, and a rear side.

According to example embodiments, the ADAS 900 may detect an event based on location of the event by tracking a bounding box designating the object and thus, may differently recognize levels of importance of a type of object based on locations thereof, thereby determining whether an event occurs based on the locations of the object.

According to example embodiments, the ADAS 900 may detect at least one video sequence (or, a stereo image) 103 including an object, from among a plurality of video sequences, and may obtain radar reflected waves or reflected lights (not shown). The ADAS 900 may detect a road 102 including a fixed pattern and another vehicle 101 moving according to time, by analyzing the at least one video sequence 103. According to example embodiments, the ADAS 900 may determine occurrence of an event based on the other vehicle 101, by analyzing a location of the other vehicle 101 including analyzing a coordinate of the other vehicle 101 in the at least one video sequence 103.

The ADAS 900 may include various circuitry, including, for example, and without limitation, head units or embedded boards in vehicles, or the like, but is not limited thereto. Also, the ADAS 900 may include wearable devices having a communication function and a data processing function, such as, for example, watches, glasses, hair bands, rings, or the like. However, the ADAS 900 is not limited thereto, and may include all types of devices configured to obtain an image (for example, a video and a still image) from a camera and provide a notification message to a user based on the obtained image.

According to example embodiments, the ADAS 900 may be a module mounted in a vehicle including various circuitry and components. The ADAS 900 may be configured to control an operation of the vehicle and communicate with other modules mounted in the vehicle via a certain network.

According to example embodiments, the vehicle may include any type of transportation, such as, for example, and without limitation, an automobile, a bus, a truck, a train, a bicycle, a motorcycle, or the like, providing a communication function, a data processing function, and/or a transportation function.

In addition, the ADAS 900 may communicate with a server (not shown) and another electronic device (not shown) via a certain network, in order to receive a video sequence, reflected waves, or reflected lights, transmit a notification message, and/or transmit a command for controlling an operation of the other electronic device. In this case, the network may include, for example, and without limitation, a local area network (LAN), a wide area network (WAN), a value-added network (VAN), a mobile radio communication network, a satellite communication network, or the like, and any combinations thereof. The network may be a comprehensive data communication network configured to enable components included in the network to smoothly communicate with one another, and may include the wired Internet, the wireless Internet, and/or a mobile wireless communication network. The wireless communication may include, for example, and without limitation, wireless LAN (Wi-fi), Bluetooth, Bluetooth low energy, Zigbee, Wi-fi direct (WFD), ultra wideband (UWB), infrared data association (IrDA), near-field communication (NFC), or the like, but is not limited thereto.

Figure 2:
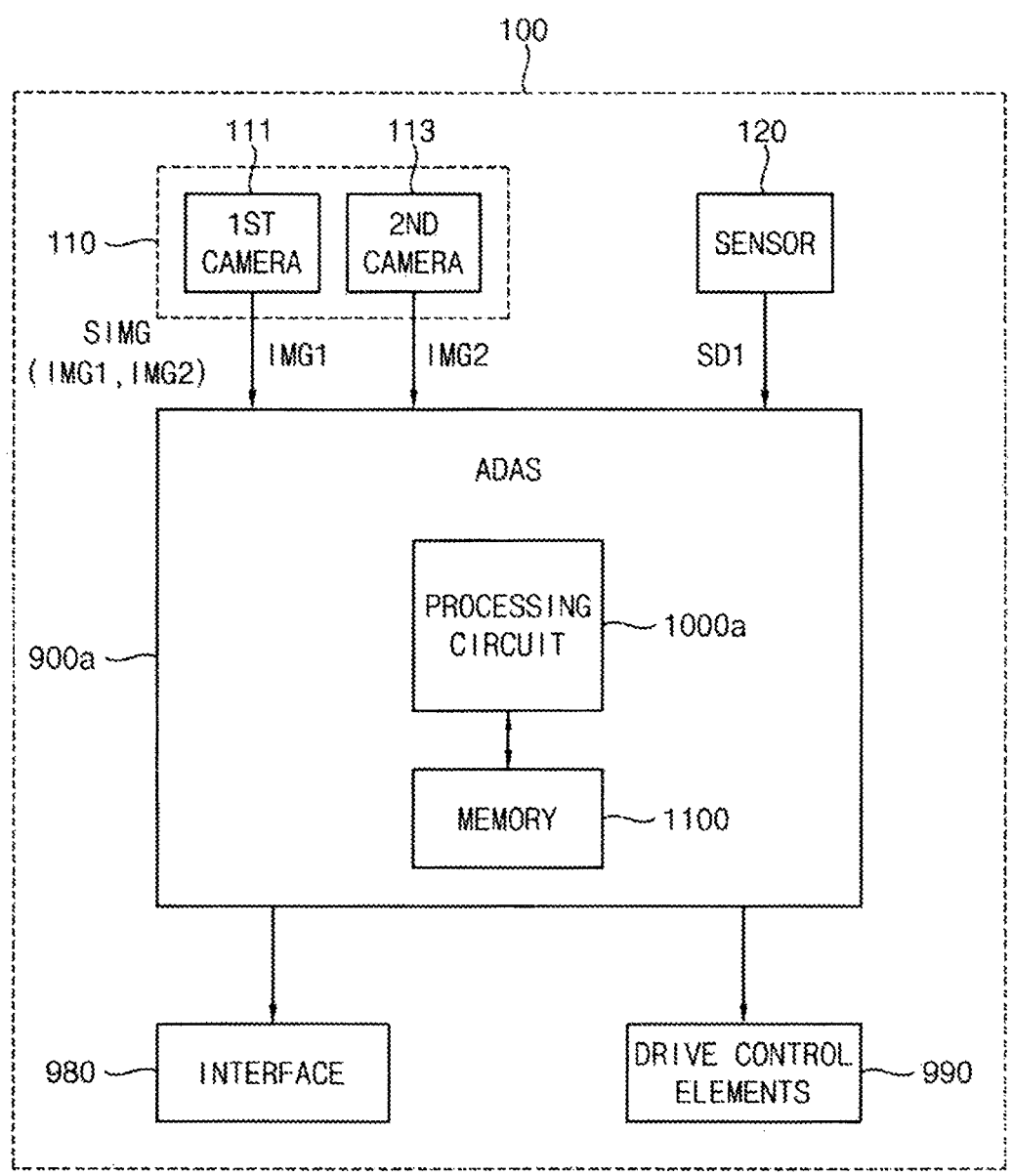
FIG. 2 is a block diagram illustrating an example of a vehicle including an ADAS according to example embodiments.

FIG. 2 is a block diagram illustrating an example of a vehicle including an ADAS according to example embodiments.

Referring to FIG. 2, the vehicle 100 may include a first sensor 110, a second sensor 120, an ADAS 900a, an interface 980 and drive control elements 990. The ADAS 900a may include a processing circuit 1000a and a memory 1100.

In some embodiments, the first sensor 110a may be a stereo camera and may include a first camera 111 and a second camera 113. The second sensor 120 may be a radar to generate distance information or a light detection and arranging (LiDAR) to generate depth information. In FIG. 2, it is assumed, for discussion purposes, that the second sensor 120 is a radar, as a non-limiting example.

The stereo camera 110a captures a front side of the vehicle 100 and provides the processing circuit 1000a with a video sequence including a plurality of frames. For example, the stereo camera 110a may capture images of regions in front of the vehicle 100.

Each of the plurality of frames may correspond to a stereo image SIMG including a first viewpoint image IMG1 and a second viewpoint image IMG2. The radar 120 may emit electromagnetic waves of a certain radio frequency or range of radio frequencies, receive radar reflected waves reflected from the object in response to the emitted waves and provide the received radar reflected waves to the processing circuit 1000a as first sensing data SD1.

The memory 1100 stores instructions executable by the processing circuit 1000a and the processing circuit 1000a executes the instructions to cause the ADAS 900a to obtain, from the vehicle 100, a stereo image SIMG captured while driving the vehicle 100, to generate a position image associated with at least one object in stereo image SIMG and to obtain the first sensing data SD1 and to generate a second position information on the at least one object.

The processing circuit 1000a executes the instructions to cause the ADAS 900a to determine regions, each including at least a portion of the at least one object as candidate bounding boxes based on the stereo image and the position image and to adjust selectively a class score of each of the candidate bounding boxes associated with the at least one object based on whether a first position information of each of the candidate bounding boxes matches the second position information and based on a comparison of the class score of each of the candidate bounding boxes with a threshold value.

The processing circuit 1000a further executes the instructions to cause the ADAS 900a to select a candidate bounding box whose selectively adjusted class score is greatest among the candidate bounding boxes as a final bounding box and to track the at least one object based on the final bounding box and an object tracking list data based on the reflected signals to provide an output signal.

As shown in FIG. 2, the ADAS 900a may be communicatively coupled to a set of one or more output interfaces 980 of the vehicle 100. The one or more output interfaces 980 may include one or more display interfaces, audio output interfaces (e.g., speakers), vibration motors, any combination thereof, or the like. In some example embodiments, the ADAS 900a may generate (e.g., transmit) an output signal that causes one or more output interfaces 980 to provide a notification message to one or more occupants (e.g., users) of the vehicle 100 or to a user device associated with a user of the vehicle. The ADAS 900a may be communicatively coupled to a set of one or more driving control elements 990 of the vehicle 100. The one or more driving control elements 990 may include one or more devices, control systems, or the like. For example, the ADAS 900a may generate an output signal that includes information that may be processed by one or more driving control elements 990 to cause the one or more driving control elements 990 to generate a driving trajectory based on the information in the output signal and to further at least partially drive the vehicle 100 along the driving trajectory.

Figure 3:
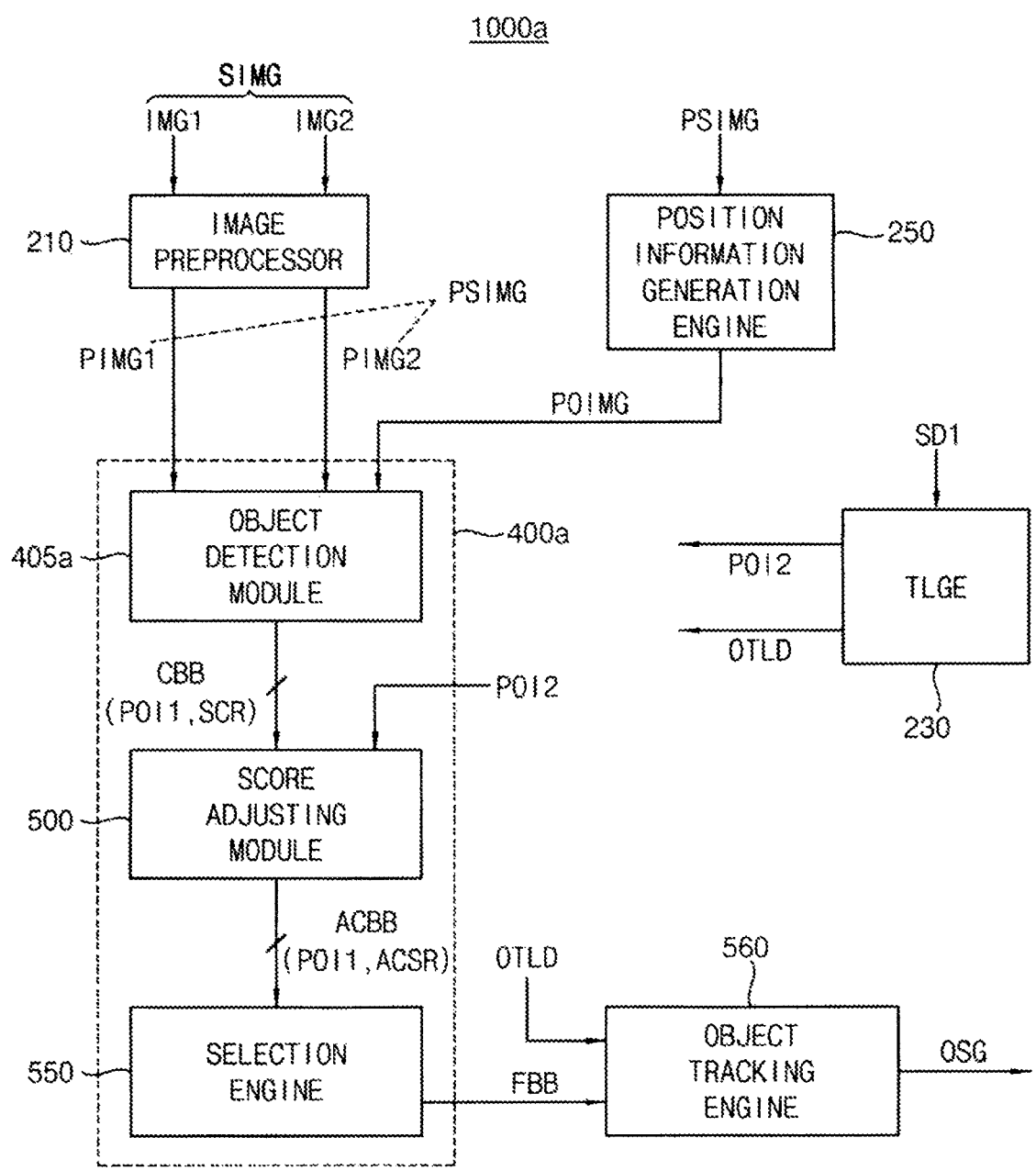
FIG. 3 is a block diagram illustrating an example of the processing circuit in FIG. 2 according to example embodiments.

FIG. 3 is a block diagram illustrating an example of the processing circuit in FIG. 2 according to example embodiments.

Referring to FIG. 3, the processing circuit 1000a may include an image pre-processor 210, a position information generation engine 250, a tracking list generation engine 230, an object detector 400a, and/or an object tracking engine 560. The object detector 400a may include an object detection module 405a, a score adjusting module 500, and/or a selection engine 550.

The image pre-processor 210 may pre-process the stereo image SIMG to output a pre-processed stereo image PSIMG including a first pre-processed viewpoint image PIMG1 and a second pre-processed viewpoint image PIMG2. The position information generation engine 250 may generate a position image POIMG with pixel level that is associated with the at least one object based on the pre-processed stereo image PSIMG and may provide the position image POIMG to the object detector 400a.

The tracking list generation engine 230 may generate an object tracking list data OTLD including a second position information POI2 based on the first sensing data SD1 (the reflected signals), may provide the second position information POI2 to the score adjusting module 500 and may provide the object tracking list data OTLD to the object tracking engine 560.

The object detection module 405a may determine regions including at least a portion of the at least one object, respectively, as candidate bounding boxes CBB based on the pre-processed stereo image PSIMG and the position image POIMG and may provide the candidate bounding boxes CBB to the score adjusting module 500. Each of the candidate bounding boxes CBB may include a first position information POI1 and a class score SCR, respectively.

The score adjusting module 500 may receive the candidate bounding boxes CBB and the second position information POI2, may adjust selectively a class score of each of the candidate bounding boxes CBB associated with the at least one object based on whether the first position information POI1 of each of the candidate bounding boxes CBB matches the second position information POI2, and based on a comparison of the class score of each of the candidate bounding boxes with the threshold value and may provide the selection engine 550 with adjusted candidate bounding boxes ACBB. Each of the adjusted candidate bounding boxes ACBB may include an adjusted score ASCR and the first position information POI1.

When the first position information POI1 matches the second position information POI2 and the class score of the candidate bounding box associated with the first position information POI1 matching the second position information POI2, the score adjusting module 500 may adjust a class score of the bounding box such that the class score of the bounding box is equal to or greater than the threshold value.

The selection engine 550 may select a candidate bounding box such as, for example, a candidate bounding box whose selectively adjusted class score is greatest among the adjusted candidate bounding boxes ACBB, as a final bounding box FBB based on the adjusted scores ACSR and may provide the final bounding box FBB to the object tracking engine 560.

The object tracking engine 560 may track the at least one object based on the final bounding box FBB and the object tracking list data OTLD to provide an output signal OSG to a driver of the vehicle 100 through the interface 980 in FIG. 2.

Figure 4:
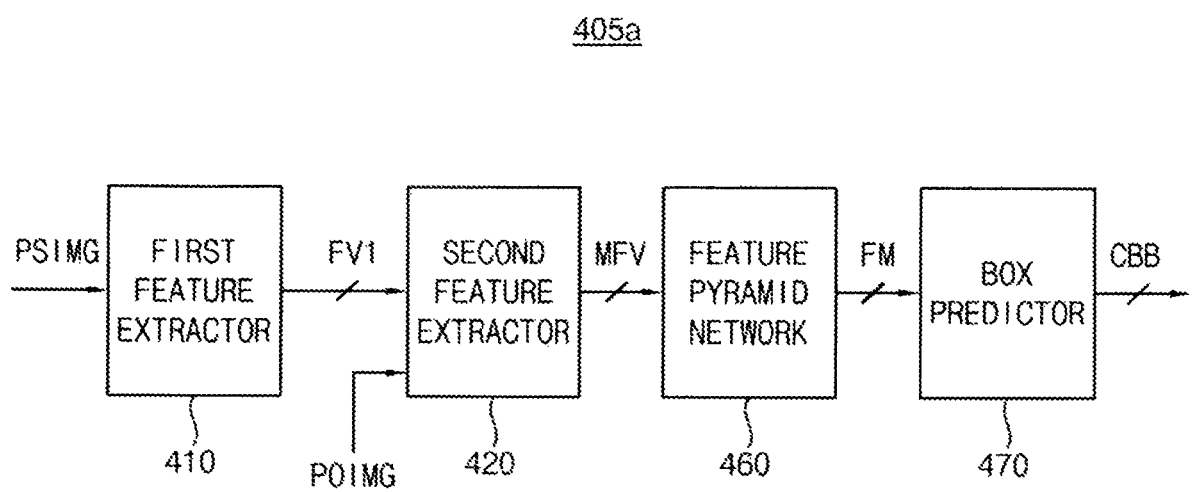
FIG. 4 is a block diagram illustrating an example of the object detection module in FIG. 3 according to example embodiments.

FIG. 4 is a block diagram illustrating an example of the object detection module in FIG. 3 according to example embodiments.

Referring to FIG. 4, the object detection module 405a may include a first feature extractor 410, a second feature extractor 420, a feature pyramid network 460 and a box predictor 470.

The first feature extractor 410 may extract features of the at least one object from the stereo image PSIMG to output first feature vectors FV1. The second feature extractor 420 may extract features of the at least one object from the position image POIMG to generate second feature vectors, may merge the first feature vectors FV1 and the second feature vectors to generate merged feature vectors MFV, and may provide the merged feature vectors MFV to the feature pyramid network 460.

The feature pyramid network 460 may generate feature maps FM on the at least one object based on the merged feature vectors MFV. The box predictor determine 470 may determine regions including at least a portion of the at least one object, respectively, as the candidate bounding boxes CBB based on the merged feature vectors MFV and may provide the candidate bounding boxes CBB to the score adjusting module 500 in FIG. 3.

Figure 5:
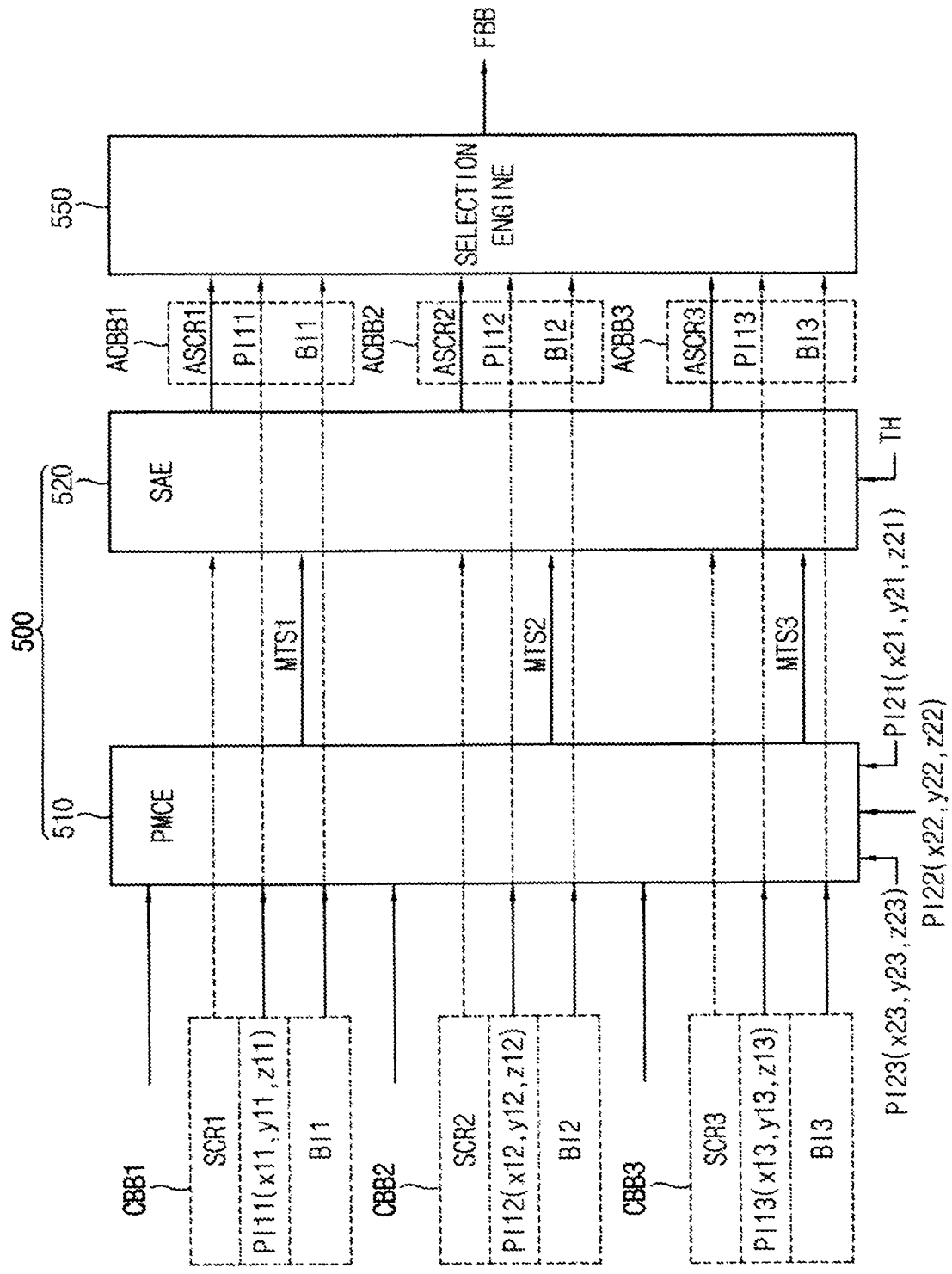
FIG. 5 is a block diagram illustrating an example of the score adjusting module in FIG. 3 according to example embodiments.

FIG. 5 is a block diagram illustrating an example of the score adjusting module in FIG. 3 according to example embodiments.

In FIG. 5, it is assumed that the candidate bounding boxes CBB include a first candidate bounding box CBB1, a second candidate bounding box CBB2 and a third candidate bounding box CBB3.

Referring to FIG. 5, the score adjusting module 500 may include a position information matching check engine (PMCE) 510 and a score adjusting engine (SAE) 520.

The PMCE 510 may check whether each of the first position information PI11, PI12, PI13 of the candidate bounding boxes CBB1, CBB2 and CBB3 matches respective one of the second position information PI21, PI22, PI23 based on bounding box information BI1, BI2 and BI3 and may output matching signals indicating MTS1, MTS2 and MTS3 indicating results of the checking to the SAE 520. Each of the first position information PI11, PI12, PI13 may be referred to as first sub position information and each of the second position information PI21, PI22, PI23 may be referred to as second sub position information. Each of the first position information PI11, PI12, PI13 may be associated with a center position of respective one of the candidate bounding boxes CBB1, CBB2 and CBB3.

The candidate bounding box CBB1 associated with a first object may have a first class score SCR1, the first position information PI11 represented by a three dimensional (3D) coordinate x11, y11 and z11 and bounding box information BI1 associated with a size and a direction of the candidate bounding box CBB1. The first object may have the second position information PI21 represented by a 3D coordinate x21, y21 and z21.

The candidate bounding box CBB2 associated with a second object may have a second class score SCR2, the first position information PI12 represented by a 3D coordinate x12, y12 and z12 and bounding box information BI2 associated with a size and a direction of the candidate bounding box CBB2. The second object may have the second position information PI22 represented by a 3D coordinate x22, y22 and z22.

The candidate bounding box CBB3 associated with a third object may have a third class score SCR3, the first position information PI13 represented by a 3D coordinate x13, y13 and z13 and bounding box information BI3 associated with a size and a direction of the candidate bounding box CBB3. The third object may have the second position information PI23 represented by a 3D coordinate x23, y23 and z23.

When the first position information PI12 matches the second position information PI22 associated with the second object and the second class score SCR2 is smaller than the threshold voltage, the PMCE 510 outputs the matching signal MTS2 with a first logic level and the SAE 520 adjusts the second class score SCR2 of the candidate bounding box CBB2 based on a threshold value TH and the matching signal MTS2 to output an adjusted class score ASCR2.

In FIG. 5, it is assumed that each of the first class score SCR1 and the third class score SCR3 is equal to or greater than the threshold value TH. The SAE 520 maintains the class scores SCR1 and SCR3 of the candidate bounding boxes CBB1 and CBB3 based on the matching signals MTS1 and MTS3 to output adjusted candidate bounding boxes ACBB1 and ACBB3 having adjusted scores ASCR1 and ASCR3, respectively and adjusts the second class score SCR2 of the candidate bounding box CBB2 to output an adjusted candidate bounding box ACBB2 having the adjusted score ASCR2.

The selection engine 550 may select an adjusted candidate bounding box whose adjusted score is greatest among the adjusted candidate bounding boxes ACBB1, ACBB2 and ACBB3 as the final bounding box FBB based on the adjusted scores ASCR1, ASCR2 and ASCR3.

Figure 6:
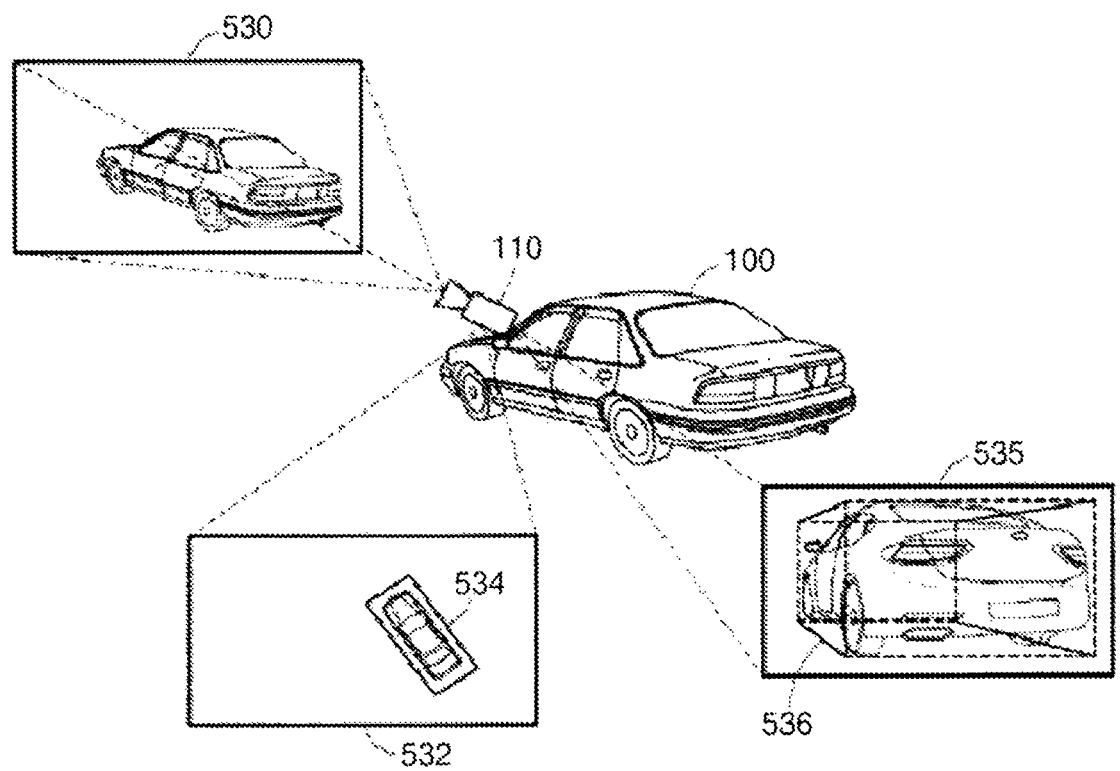
FIG. 6 illustrates an example of a perspective projection image and a bird's eye view projection image according to example embodiments.

FIG. 6 illustrates an example of a perspective projection image and a bird's eye view projection image according to example embodiments.

The camera 110 mounted in the vehicle 100 may acquire an image 530 representing an object in front of the vehicle 100. The ADAS 900, which includes camera 110, generates or acquires information about various viewpoints to estimate a location of the vehicle 100. In an example, the ADAS 900 generates a bird's eye view projection image 532 and a perspective projection image 535 in front of the vehicle 100. In another example, the ADAS 900 generates a bird's eye view projection image 532 and a perspective projection image 535 based on a color image in front of the vehicle 100 and a depth image of a bird's eye view.

The bird's eye view projection image 532 is, for example, a projection image corresponding to a viewpoint (for example, a top view) of an observation at an altitude above a height of a device including the camera 110. The bird's eye view projection image 532 includes a bird's eye view bounding box 534 corresponding to an object located around the device including the camera 110.

The perspective projection image 535 is, for example, a projection image corresponding to a viewpoint from which a movement direction of a device including the camera 110 is observed at an altitude corresponding to the height of the device including the camera 110. The perspective projection image 535 includes a perspective bounding box 536 corresponding to an object located in the movement direction of the device including the camera 110.

Figure 7:
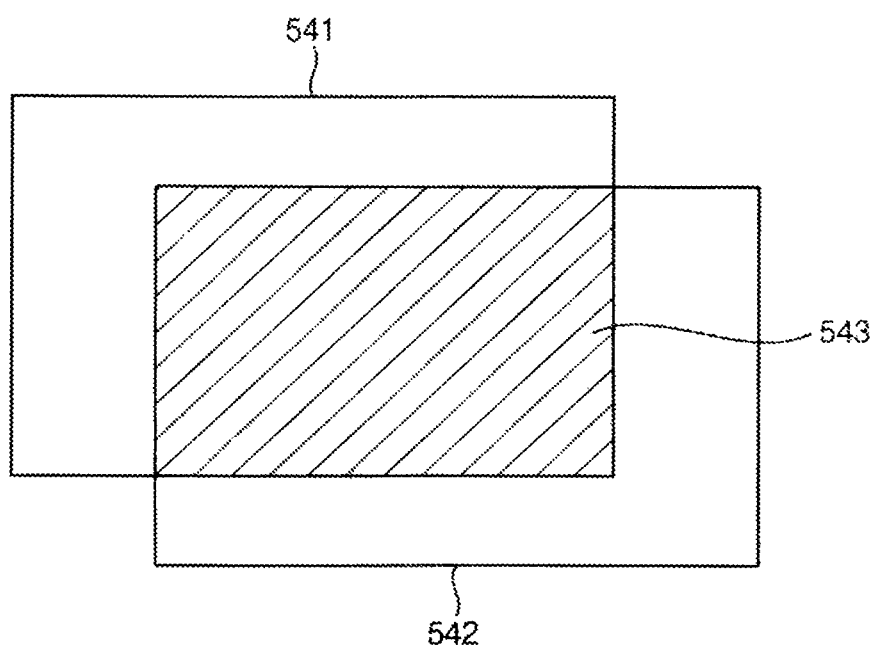
FIG. 7 illustrates an example of an intersection over union (IoU) in 2D bounding box.

FIG. 7 illustrates an example of an intersection over union (IoU) in a 2D bounding box.

The 3D bounding box may be obtained based on the description with reference to FIG. 7.

The objection detection module 405a in the ADAS 900 calculates, based on an IoU, a loss of a bounding box corresponding to an object detected from a projection image corresponding to each viewpoint. A measure known as IoU corresponds to a ratio of an intersection area to a union area, in shown in FIG. 7. The IoU is an indicator indicating a degree of overlap between an output bounding box and a reference bounding box, and represents, for example, a value obtained by dividing an area of an intersection region 543 between two regions by an area of a union region.

For example, the object detection module 405a determines an output bounding box 541 corresponding to an object from an input image, with respect to a projection image corresponding to an arbitrary viewpoint. The object detection module 405a compares the output bounding box 541 to a reference bounding box 542.

The reference bounding box 542 is a training output paired with the input image, that is, a training input, and is, for example, ground truth data. The object detection module 405a determines an IoU loss based on the value obtained by dividing the area of the intersection region 543 between the output bounding box 541 and the reference bounding box 542 by the area of the union region. For example, when a value of an IoU approaches "1", a similarity between the output bounding box 541 and the reference bounding box 542 increases.

Figure 8:
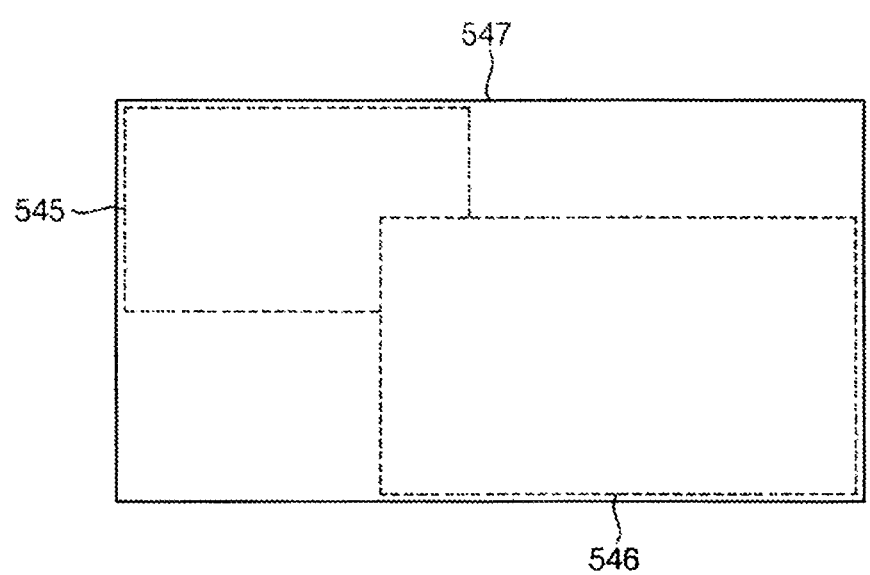
FIG. 8 illustrates an example of a perspective bounding box according to example embodiments.

FIG. 8 illustrates an example of a perspective bounding box according to example embodiments.

A perspective bounding box is a 2D bounding box, and includes a front face box 545 and a rear face box 546.

The perspective bounding box is, for example, a box obtained by projecting a 3D bounding box to a perspective projection image corresponding to a perspective view. For example, the perspective bounding box is a box obtained by converting 3D coordinates of a 3D bounding box corresponding to an object into 2D coordinates of a perspective projection image. For example, the front face box 545 of the perspective bounding box is a box obtained by converting 3D coordinates of four points corresponding to a front face of the 3D bounding box into 2D coordinates on the perspective projection image. The rear face box 546 of the perspective bounding box is a box obtained by converting 3D coordinates of four points corresponding to a rear face of the 3D bounding box into 2D coordinates on the perspective projection image.

The object detection module 405a defines a new reference box for an IoU calculation, to calculate a loss of the perspective bounding box. For example, the object detection module 405a determines a target box 547 based on the front face box 545 and the rear face box 546 from a perspective bounding box that is acquired by a second projection calculator and that corresponds to an object. The front face box 545 and the rear face box 546 indicate a front face and a rear face of the object, respectively. The object detection module 405a determines, as the target box 547, a box that has a minimum region and that includes the front face box 545 and the rear face box 546. The target box 547 is used as the output bounding box 541 described above with reference to FIG. 7.

Figure 9:
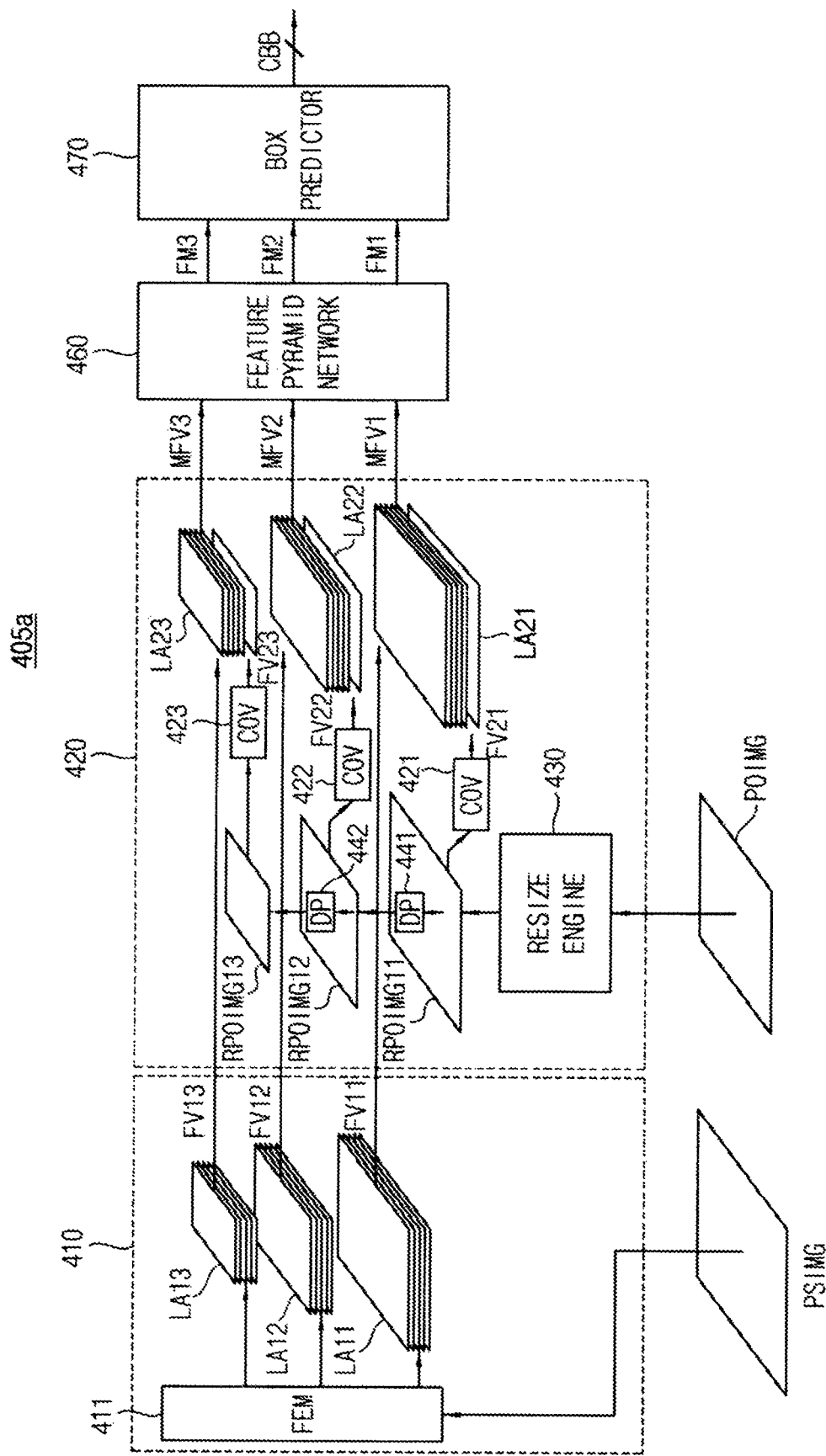
FIG. 9 is a block diagram illustrating an example of the object detection module of FIG. 4 according to example embodiments.

FIG. 9 is a block diagram illustrating an example of the object detection module of FIG. 4 according to example embodiments.

Referring to FIG. 9, the object detection module 405a may include the first feature extractor 410, the second feature extractor 420, the feature pyramid network 460 and the box predictor 470.

The first feature extractor 410 may include a feature extraction module (FEM) 411 and a plurality of first layers LA11, LA12 and LA13 and may extract features of the at least one object from the pre-processed stereo image PSIMG using the FEM and the first layers LA11, LA12 and LA13 to provide first feature vectors FV11, FV12 and FV13.

The second feature extractor 420 may include a resizing engine 430 and the resizing engine 430 may adjust a size and a resolution of the position image POIMG with respect to a size and a resolution of the pre-processed stereo image PSIMG.

The resizing engine 430 may adjust a resolution of the position image POIMG, may resize a size of the position image POIMG to generate a resized position image RPOIMG11, and may extract features of resized position images RPOIMG11, RPOIMG12 and RPOIMG13 by using convolution layers 421, 422 and 423 to generate second feature vectors FV21, FV22 and FV23. The second feature extractor 420 may merge the first feature vectors FV11, FV12 and FV13 and the second feature vectors FV21, FV22 and FV23 by using second layers LA21, LA22 and LA23 to generate the merged feature vectors MFV1, MFV2 and MFV3 and provide the merged feature vectors MFV1, MFV2 and MFV3 to the feature pyramid network 460.

The second feature extractor 420 may further include down samplers 441 and 442, may perform down-sampling on the position image RPOIMG11 at least once to generate the resized position images RPOIMG12 and RPOIMG13.

The feature pyramid network 460 may generate feature maps FM1, FM2 and FM3 based on the merged feature vectors MFV1, MFV1 and MFV1 and the box predictor 470 may provide the candidates bounding boxes CBB based on the feature maps FM1, FM2 and FM3.

According to example embodiments, the box predictor 470 may mark the at least one object detected in the feature maps FM1, FM2 and FM3 by using at least one of a single shot detector (SSD) or a faster recurrent convolution neural network (R-CNN) and may provide the candidates bounding boxes CBB.

Figure 10:
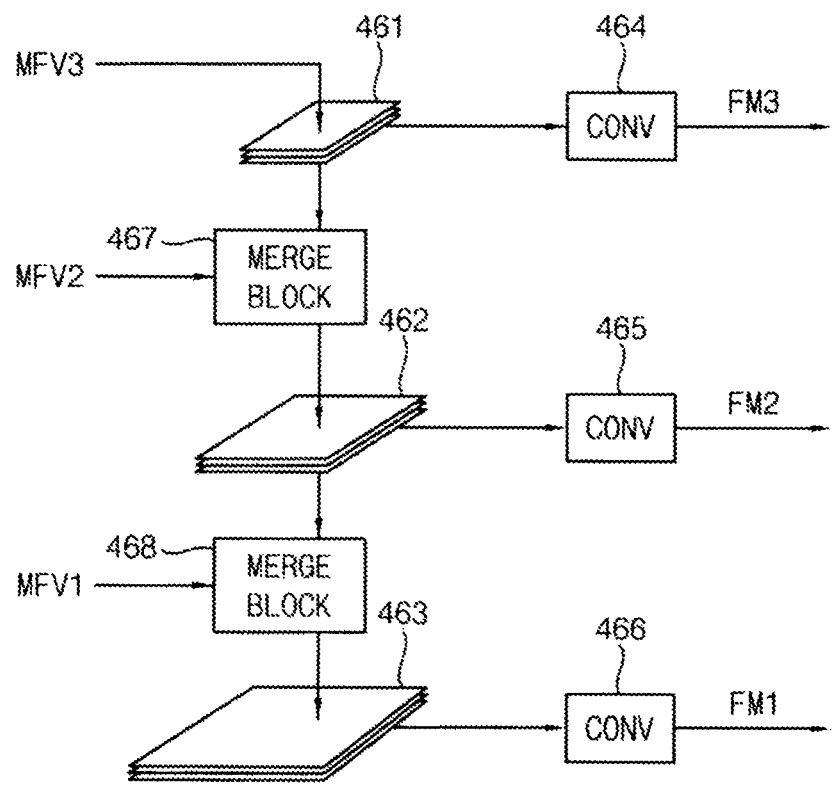
FIG. 10 illustrates an example of the feature pyramid network in FIG. 9 according to example embodiments.

FIG. 10 illustrates an example of the feature pyramid network in FIG. 9 according to example embodiments.

Referring to FIG. 10, the feature pyramid network 460 may generate high-resolution feature maps FM1, FM2 and FM3 based on the merged feature vectors MFV1, MFV2, and MFV3.

The feature pyramid network 460a may include a plurality of layers 461, 462 and 463, a plurality of merge blocks 467 and 468 and a plurality of convolution kernels 464, 465, 466. The number of the layers and the convolution kernels are not limited thereto.

The layer 461 up-samples the merged feature vector MFV3 and the convolution kernel 464 applies a convolution conversion to an output of the layer 461 to output the feature map FM3. The merge block 467 merges the output of the layer 461 and the merged feature vector MFV2 and provides merged output.

The layer 462 up-samples the output of the merge block 467 and the convolution kernel 465 applies a convolution conversion to an output of the layer 462 to output the feature map FM2. The merge block 468 merges the output of the layer 462 and the merged feature vector MFV1 and provides merged output. The layer 463 up-samples the output of the merge block 468 and the convolution kernel 466 applies a convolution kernel to an output of the layer 463 to output the feature map FM1.

Figure 11:
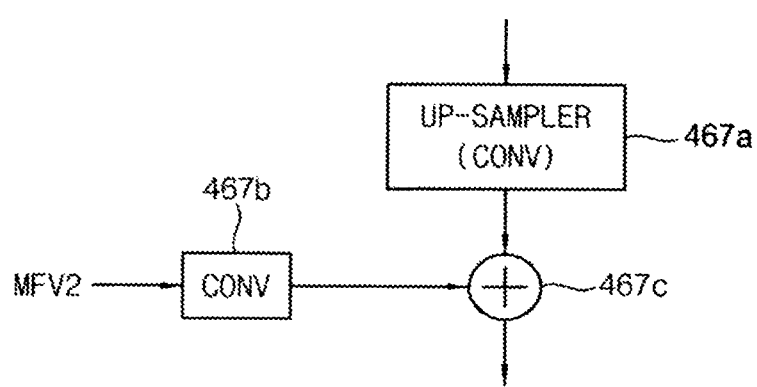
FIG. 11 illustrates an example of the merge block in the feature pyramid network of FIG. 10.

FIG. 11 illustrates an example of the merge block in the feature pyramid network of FIG. 10.

Referring to FIG. 11, the merge block 467 may include an up-sampler 467a, a convolutional layer (kernel) 467b and a summer 467c.

The up-sampler 467a up-samples the output of the layer 461 and provides up-sampled output to the summer 467c. The up-sampler 467a may include a convolution layer CONV. The convolution layer CONV applies to a convolution conversion to the merged feature vector MFV2 to provide converted output to the summer 467c. The summer 467c sums the output of the up-sampler 467a and the output of the convolution layer 467b and provides summed result to the layer 462.

Figure 12:
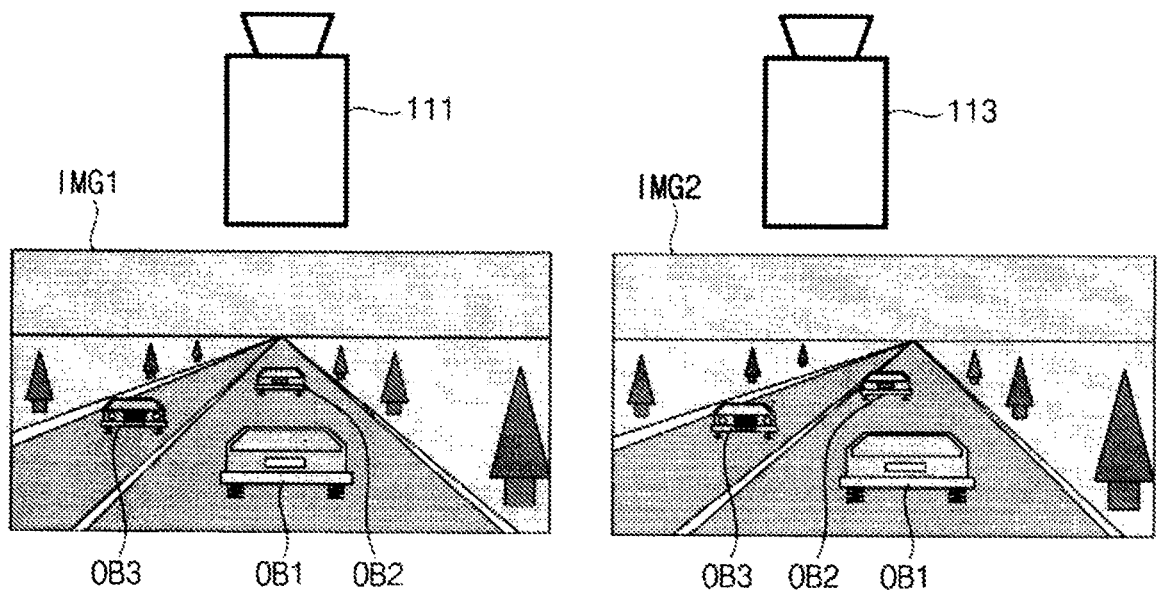
FIGS. 12 and 13 illustrate objects in the first view point image and the second view point image according to positions of the first camera and the second camera in FIG. 2, respectively.
Figure 13:
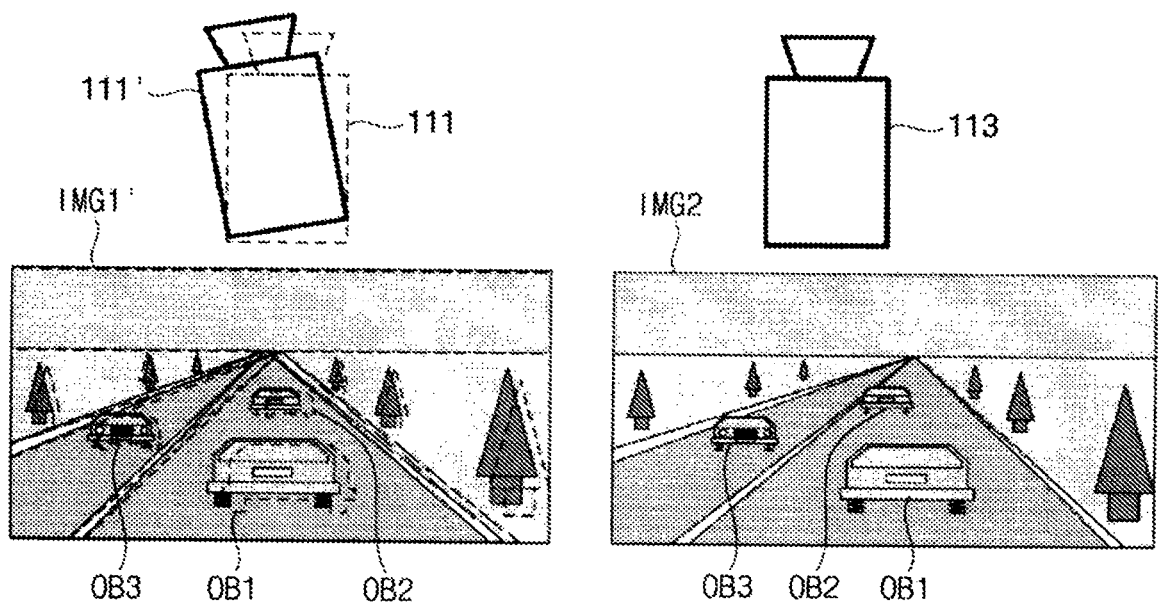

FIGS. 12 and 13 illustrate objects in the first view point image and the second view point image according to positions of the first camera 111 and the second camera 113 in FIG. 2, respectively.

FIG. 12 illustrates the first view point image IMG1 and the second view point image IMG2 when the first camera 111 and the second camera 113 are positioned at their original positions. If calibration information on the first camera 111 and the second camera 113 may be obtained, depth information on objects OB1, OB2 and OB3 may be accurately obtained by using disparity information between the first view point image IMG1 and the second view point image IMG2.

FIG. 13 illustrates that a physical position of the first camera 111 is changed from its original position. When the physical position of the first camera 111 is changed to a position 111', the first view point image IMG1 is changed to a first view point image IMG1' and positions of objects OB1, OB2 and OB2 in the first view point image IMG1' are also changed. Therefore, disparity information between the first view point image IMG1' and the second view point image IMG2, which is processed by the processing circuit 1000a of FIG. 2, is changed and accuracy of depth information on the objects OB1, OB2 and OB3 based on the disparity information is decreased. Dotted lines in the first view point image IMG1' denote the objects OB1, OB2 and OB3 before the physical position of the first camera 111 is changed and solid lines in the first view point image IMG1' denote the objects OB1, OB2 and OB3 after the physical position of the first camera 111 is changed.

Figure 14:
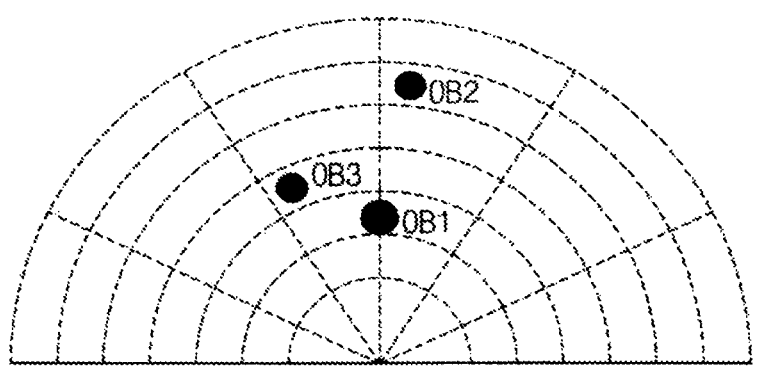
FIG. 14 illustrates an object tracking list which is generated based on a first sensing data obtained by the second sensor in FIG. 2.

FIG. 14 illustrates an object tracking list which is generated based on a first sensing data obtained by the second sensor 120 in FIG. 2.

Referring to FIG. 14, an object tracking list OTL may represent a distance and/or velocity of each of the objects OB1, OB2 and OB3 from the second sensor, i.e., the radar 120 based on the first sensing data SD1 obtained by the radar 120. That is, the object tracking list OTL may represent depth information on each of the objects OB1, OB2 and OB3.

Figure 15:
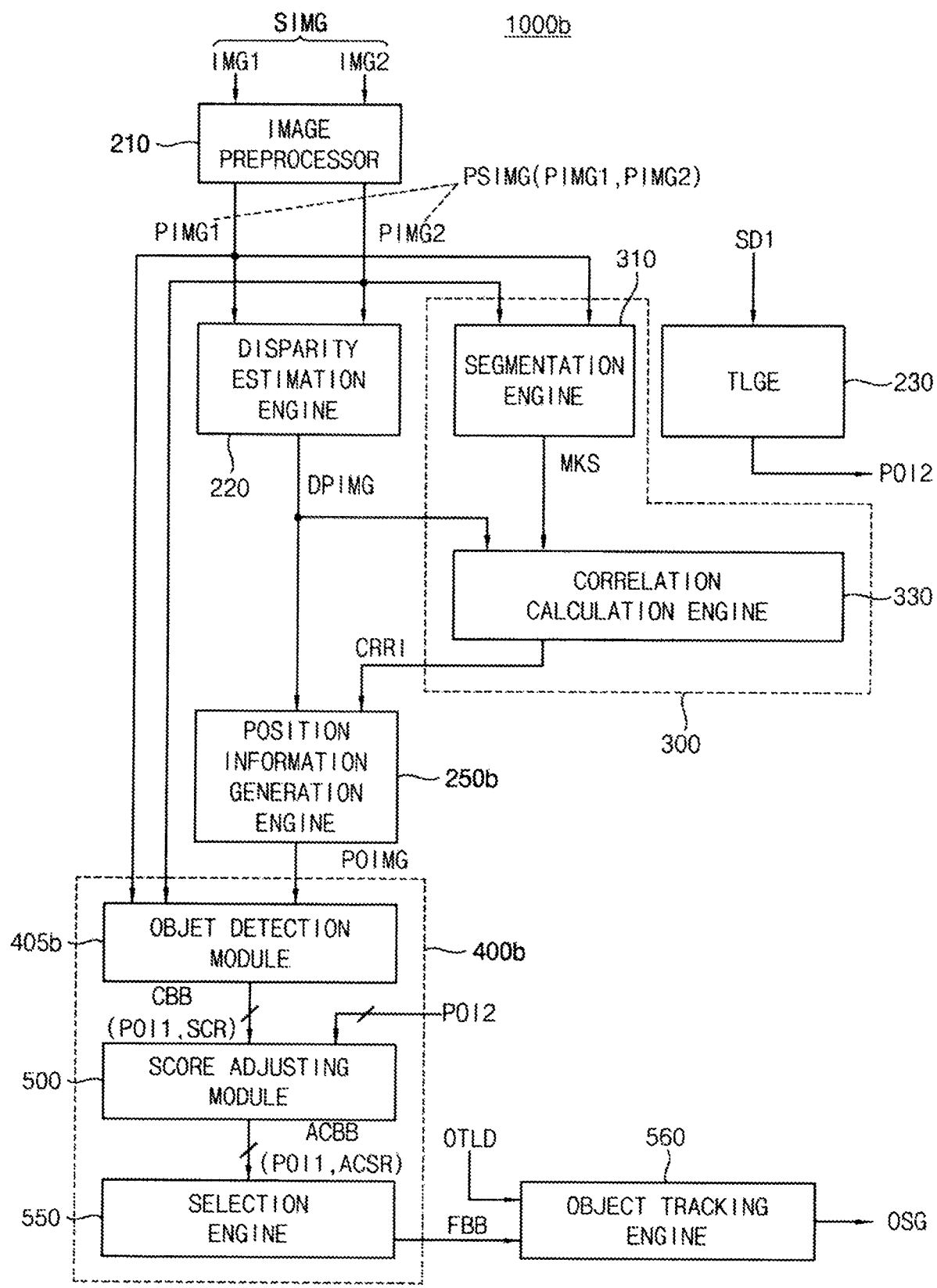
FIG. 15 is a block diagram illustrating another example of the processing circuit in the ADAS in FIG. 2 according to example embodiments.

FIG. 15 is a block diagram illustrating another example of the processing circuit 1000a in the ADAS in FIG. 2 according to example embodiments.

Referring to FIG. 15, a processing circuit 1000b may include an image pre-processor 210, a disparity estimation engine 220, a tracking list generation engine (TLGE) 230, a correlation calculation module 300, a position image generation engine 250b, an object detector 400b and an object tracking engine 560. The object detector 400a may include an object detection module 405b, a score adjusting module 500 and a selection engine 550.

The image pre-processor 210 may pre-process the stereo image SIMG to output a pre-processed stereo image PSIMG including a first pre-processed viewpoint image PIMG1 and a second pre-processed viewpoint image PIMG2. The image pre-processor 210 may perform noise reduction, rectification, calibration, color enhancement, color space conversion, interpolation, and camera gain control on the stereo image SIMG. The image pre-processor 210 may output the pre-processed stereo image PSIMG which is more clear than the stereo image SIMG.

According to example embodiments, the processing circuit 1000b may not include the image pre-processor 210 and in this case, the stereo image SIMG including at least one of the first view point image IMG1 and the second view point image IMG2 may be provided to the disparity estimation engine 220 and a segmentation engine 310.

The disparity estimation engine 220 may generate a disparity image DPIMG including the disparity information based on the first pre-processed viewpoint image PIMG1 and the second pre-processed viewpoint image PIMG2. The disparity estimation engine 220 may output the disparity image DPIMG including the disparity information by performing stereo matching on the first pre-processed viewpoint image PIMG1 and the second pre-processed viewpoint image PIMG2. The disparity estimation engine 220 may output the disparity image DPIMG based on a difference between pixel values of corresponding pixels of the first pre-processed viewpoint image PIMG1 and the second pre-processed viewpoint image PIMG2.

The tracking list generation engine 230 may generate an object tracking list data OTLD including a second position information POI2 based on the first sensing data SD1 (the reflected signals), may provide the second position information POI2 to the score adjusting module 500 and may provide the object tracking list data OTLD to the object tracking engine 560.

The correlation calculation engine 300 may calculate correlation information CRRI based on pre-processed stereo image PSIMG, the object tracking list data OTLD and/or the disparity image DPIMG including the disparity information and may provide the correlation information CRRI to the position image generation engine 250b.

The correlation calculation engine 300 may include a scene segmentation engine 310 and a correlation calculation engine 330.

The scene segmentation engine 310 may segment the at least one object from at least one of the first pre-processed viewpoint image PIMG1 and the second pre-processed viewpoint image PIMG2 to extract at least one mask MKS.

The correlation calculation engine 330 may receive the disparity image DPIMG including the disparity information, may calculate the correlation information CRRI between the depth information and the disparity information based on the mask MKS and the disparity information and may provide the correlation information CRRI to the position image generation engine 250b.

The position image generation engine 250b may correct depth values of the pre-processed stereo image PSIMG based on the disparity information and the correlation information CRRI to generate the position image POIMG including the at least one object and may provide the position image POIMG to the object detector 400b.

For example, the position image generation engine 250b may correct depth values of the pre-processed stereo image PSIMG the based on equation 1.

$$Z=(B \times f \times s)/d \quad \text{[Equation 1]}$$

In equation 1, Z denotes a depth value, B denotes a baseline, which is a distance between the first camera 111 and the second camera 112, f denotes a camera focal length of the first camera 111 and/or the second camera 112, d denotes a disparity, and s corresponds to the correlation information CRRI1.

The object detection module 405b may determine regions including at least a portion of the at least one object, respectively, as candidate bounding boxes CBB based on the pre-processed stereo image PSIMG and the position image POIMG and may provide the candidate bounding boxes CBB to the score adjusting module 500. Each of the candidate bounding boxes CBB may include a first position information POI1 and a class score SCR, respectively.

The score adjusting module 500 may receive the candidate bounding boxes CBB and the second position information POI2, may adjust selectively a class score of each of the candidate bounding boxes CBB associated with the at least one object based on whether the first position information POI1 of each of the candidate bounding boxes CBB matches the second position information POI2 and based on a comparison of the class score of each of the candidate bounding boxes with the threshold value and may provide the selection engine 550 with adjusted candidate bounding boxes ACBB. Each of the adjusted candidate bounding boxes ACBB may include an adjusted score ASCR and the first position information POI1.

When the first position information POI1 matches the second position information POI2 and the class score of the candidate bounding box associated with the first position information POI1 matching the second position information POI2, the score adjusting module 500 may adjust a class score of the bounding box such that the class score of the bounding box is equal to or greater than the threshold value.

The selection engine 550 may select a candidate bounding box whose selectively adjusted class score is greatest among the adjusted candidate bounding boxes ACBB as a final bounding box FBB based on the adjusted scores ACSR and may provide the final bounding box FBB to the object tracking engine 560.

The object tracking engine 560 may track the at least one object based on the final bounding box FBB and the object tracking list data OTLD to provide an output signal OSG to a driver of the vehicle 100 through the interface 980 in FIG. 2.

Figure 16:
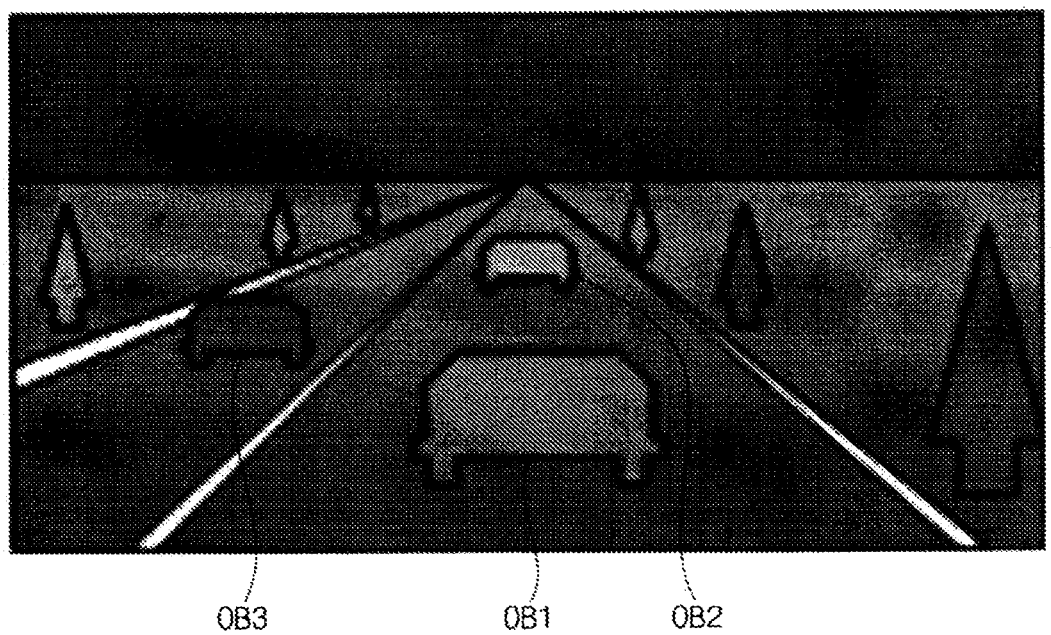
FIG. 16 illustrates an example of the disparity image in the processing circuit in FIG. 15.

FIG. 16 illustrates an example of the disparity image in the processing circuit in FIG. 15.

Referring to FIGS. 15 and 16, the disparity estimation engine 220 may output the disparity image DPIMG including objects OB1, OB2 and OB3, based on a difference between pixel values of corresponding pixels of the first pre-processed viewpoint image PIMG1 and the second pre-processed viewpoint image PIMG2.

Figure 17:
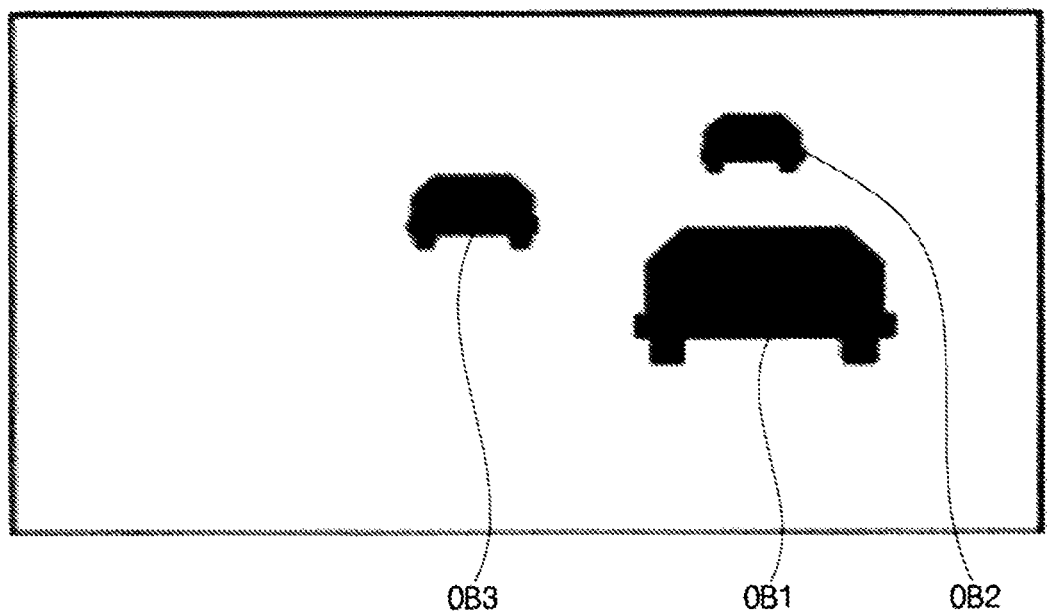
FIG. 17 illustrates an example of the mask in the processing circuit in FIG. 15.

FIG. 17 illustrates an example of the mask in the processing circuit 1000b in FIG. 15.

Referring to FIGS. 15 and 17, the scene segmentation engine 310 may segment the at least one object from at least one of the first pre-processed viewpoint image PIMG1 and the second pre-processed viewpoint image PIMG2 to extract masks MKS. The masks MSK may be represented as the same color without respect to a distance from the baseline.

Figure 18:
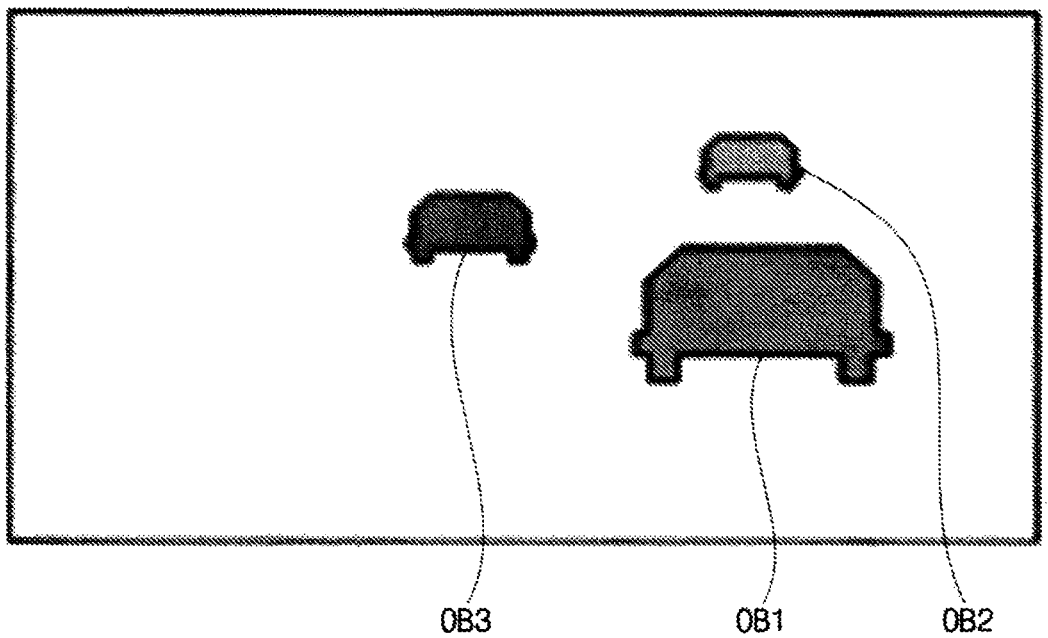
FIG. 18 illustrates an example in which the correlation calculation engine in the processing circuit in FIG. 15 combines the disparity image and the mask.

FIG. 18 illustrates an example in which the correlation calculation engine in the processing circuit in FIG. 15 combines the disparity image and the mask.

Referring to FIGS. 15 and 18, the correlation calculation engine 330 may combine the disparity image DPIMG and the masks MSK to represent masks MSK with different identifiers according to distance of the objects OB1, OB2 and OB3 from the baseline.

Figure 19:
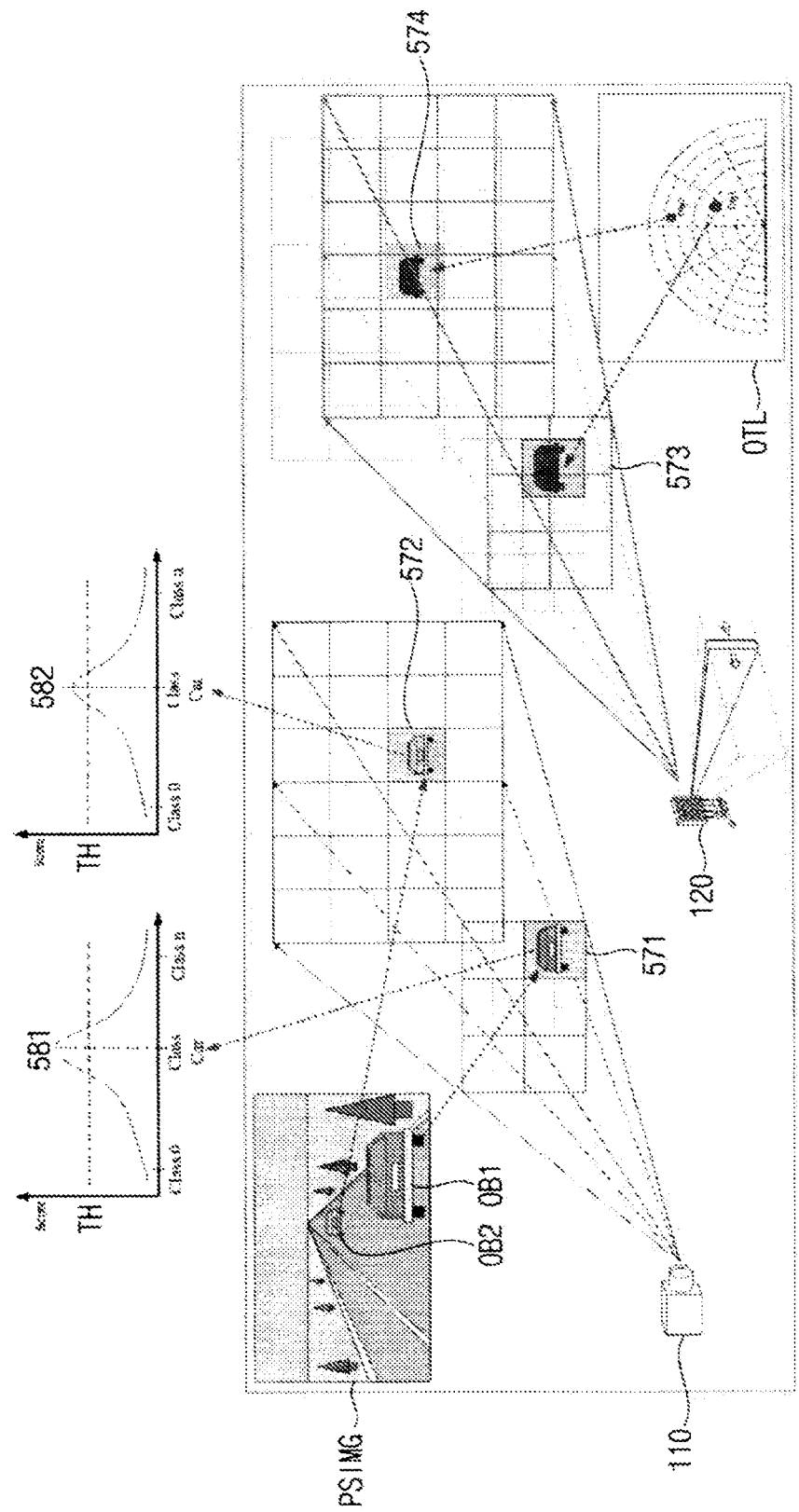
FIGS. 19 and 20 illustrate operations of the processing circuit, respectively, according to example embodiments.
Figure 20:
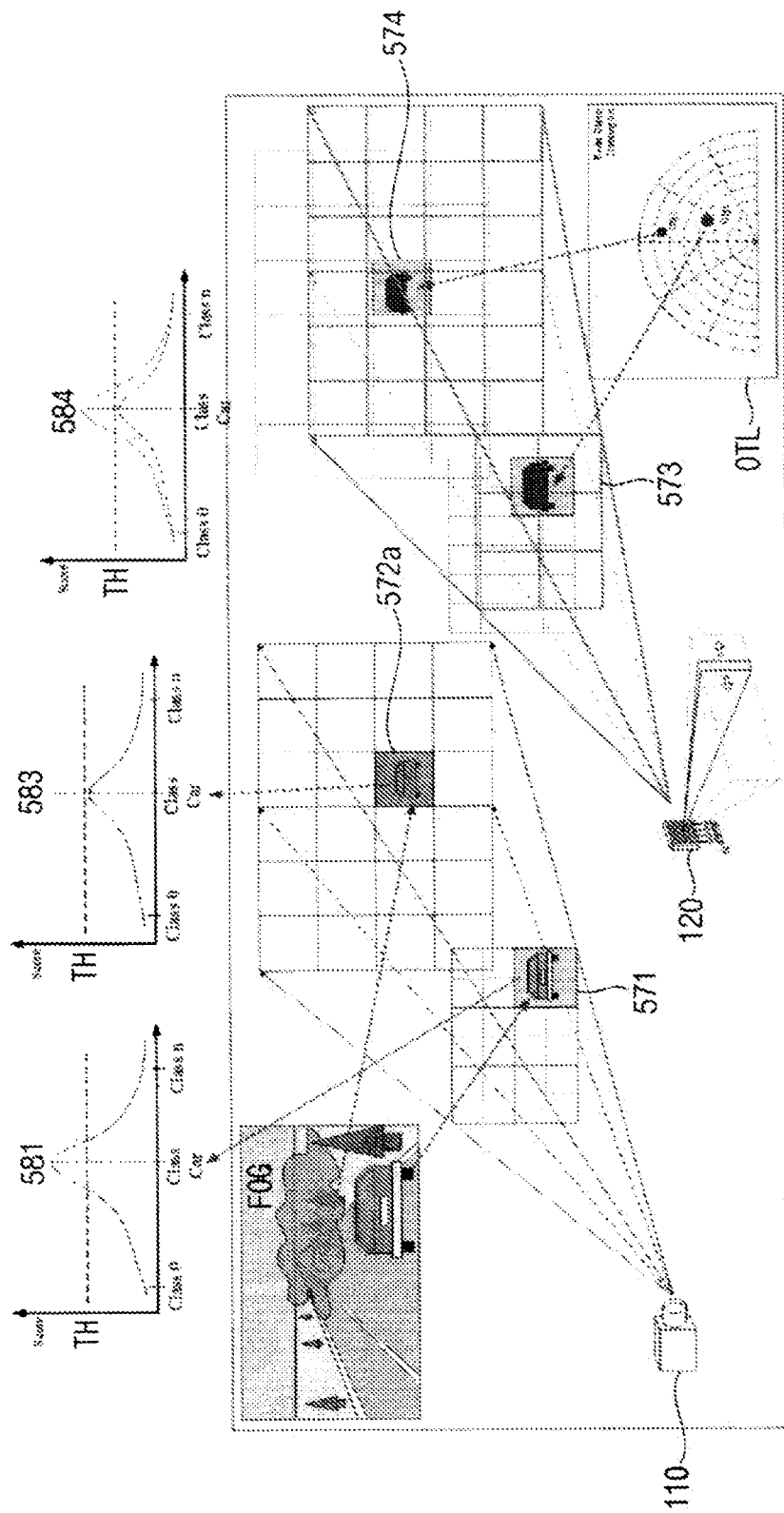

FIGS. 19 and 20 illustrate operations of the processing circuit 1000a or 1000b, respectively, according to example embodiments.

FIG. 19 illustrates an operation of the processing circuit 1000a or 1000b in a normal environment and FIG. 20 illustrates an operation of the processing circuit 1000a or 1000b in an abnormal environment (such an foggy environment).

Referring to FIG. 19, the pre-processed stereo image PSIMG includes the first object OB1 and the second object OB2, and the object detection module 405a or 405b outputs a candidate bounding box 571 having a first class score 581 with respect to the first object OB1 and outputs a candidate bounding box 572 having a second class score 582 with respect to the second object OB2 based on the output of the camera 110.

Each of the first class score 581 and the second class score 582 is equal to or greater than the threshold value TH. The first object OB1 is detected 573 and the second object OB2 is detected 574 by the object tracking list OTL based on the reflected signals by the radar 120. Although, the first position information of each of the first object OB1 and the second object OB2 matches the second position information of each of the first object OB1 and the second object OB2, the score adjusting module 500 maintains the first class score 581 and the second class score 582 because each of the first class score 581 and the second class score 582 is equal to or greater than the threshold value TH.

Referring to FIG. 20, the pre-processed stereo image PSIMG includes the first object OB1 and the second object OB2, and the second object OB2 is hidden by a fog FOG. The object detection module 405a or 405b outputs a candidate bounding box 571 having a first class score 581 with respect to the first object OB1 and outputs a candidate bounding box 572a having a second class score 583 with respect to the second object OB2 based on the output of the camera 110.

The first class score 581 is greater than the threshold value TH and the second class score 583 is smaller than the threshold value TH. The first object OB1 is detected 573 and the second object OB2 is detected 574 by the object tracking list OTL based on the reflected signals by the radar 120. Since the first position information of each of the first object OB1 and the second object OB2 matches the second position information of each of the first object OB1 and the second object OB2 and the second class score 583 smaller than the threshold value TH, the score adjusting module 500 adjusts the second class score 583 such that the second class score 583 is greater than the threshold value TH as a reference numeral 584 indicates.

FIG. 21 is an example of algorithm illustrating an operation of the score adjusting module according to example embodiments.

Referring to FIG. 21, the score adjusting module 500 adjusts a class score of a candidate bounding box whose first position information matches the second position information and whose class core is smaller than the threshold value such that the class score of the candidate bounding box becomes greater than the threshold value. The selection engine 550 may select a candidate bounding box whose selectively adjusted class score is greatest among the candidate bounding boxes CBB as the final bounding box FBB by performing non-maximum suppression (NMS).

Figure 22A:
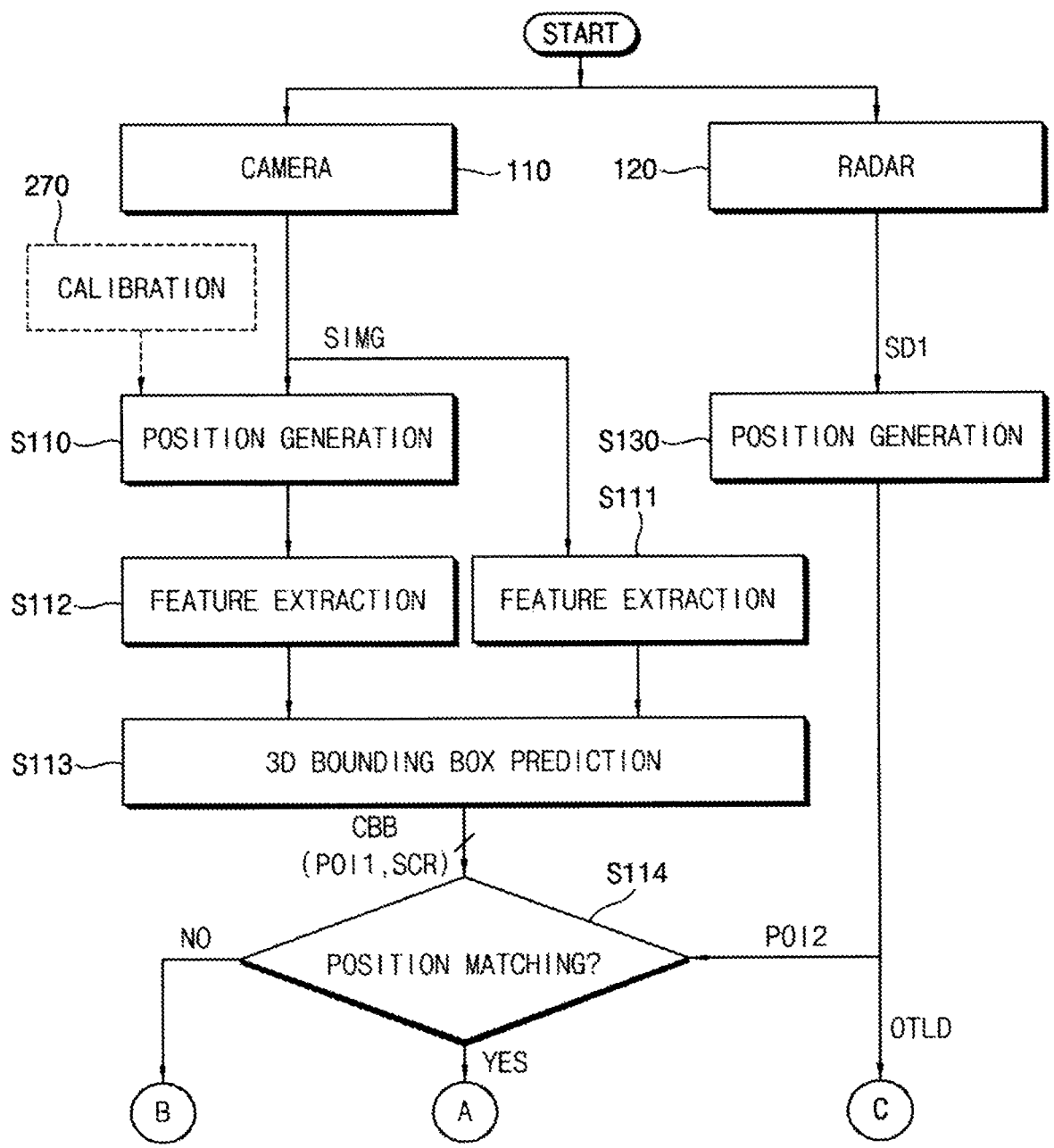
FIGS. 22A and 22B are flow charts illustrating an operation of the ADAS according to example embodiments.
Figure 22B:
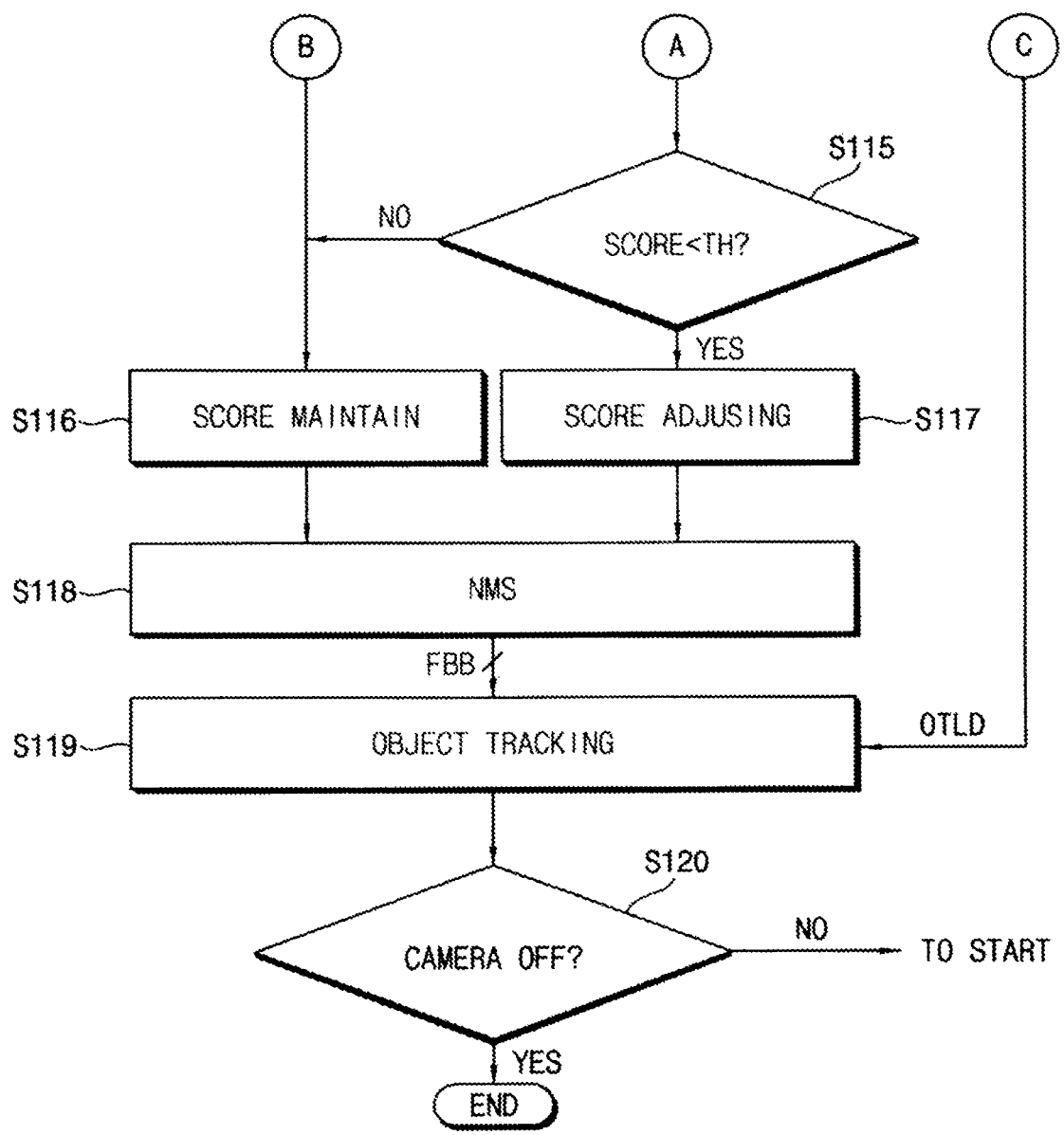

FIGS. 22A and 22B are flow charts illustrating an operation of the ADAS according to example embodiments.

Referring to FIGS. 1 through 22B, the camera 110 in the vehicle 100 generates the position image including at least one object based on the stereo image SIMG (operation S110), the TLGE 230 generates the second position information POI2 and the object tracking list data OTLD based on the first sensing data SD1 from the radar 120 in the vehicle (operation S130).

The object detection module 405a generates the first feature vectors based on the stereo image SIMG (operation S111), generates the second feature vectors based on the position image POIMG (operation S112), merges the first feature vectors and the second feature vectors to generate the merged feature vectors and provides the candidate bounding boxes CBB based on the merged feature vector (operation S113). Each of the candidate bounding boxes CBB may include a first position information POI1 and a class score SCR, respectively.

The score adjusting module 500 may check whether the first position information POI1 matches the second position information POI2 (operation S114).

When the first position information POI1 matches the second position information POI2 (YES in operation S114), the score adjusting module 500 determines whether a class score SCR of the candidate bounding box is smaller than the threshold value TH (operation S115). When the first position information POI1 does not match the second position information POI2 (NO in operation S114), the score adjusting module 500 maintains the class score SCR of the candidate bounding box (operation S116).

When the class score SCR of the candidate bounding box is not smaller than the threshold value TH (NO in operation S115), the score adjusting module 500 maintains the class score SCR of the candidate bounding box (operation S116). When the class score SCR of the candidate bounding box is smaller than the threshold value TH (YES in operation S115), the score adjusting module 500 adjusts the class score SCR of the candidate bounding box such that the class score SCR of the candidate bounding box becomes greater than the threshold value TH (operation S117).

The selection engine 550 may select a candidate bounding box whose selectively adjusted class score is greatest among the candidate bounding boxes CBB as the final bounding box FBB by performing the NMS to provide the final bounding box FBB (operation S118).

The object tracking engine 560 may track the at least one object based on the final bounding box FBB and the object tracking list data OTLD to provide an output signal OSG (operation S119).

The processing circuit 1000a or 1000b may determine whether the camera 110 is turned-off (operation S120). When the camera 110 is turned-off (YES in operation S120), the processing circuit 1000a or 1000b ends the process. When the camera 110 is not turned-off (NO in operation S120), the processing circuit 1000a or 1000b returns the process to the starting operation.

A calibration engine 270 may calibrate ranges of the camera 110 and the radar 120 by using the first position information and the second position information of the candidate bounding box having a high class score as calibration data set.

Figure 23:
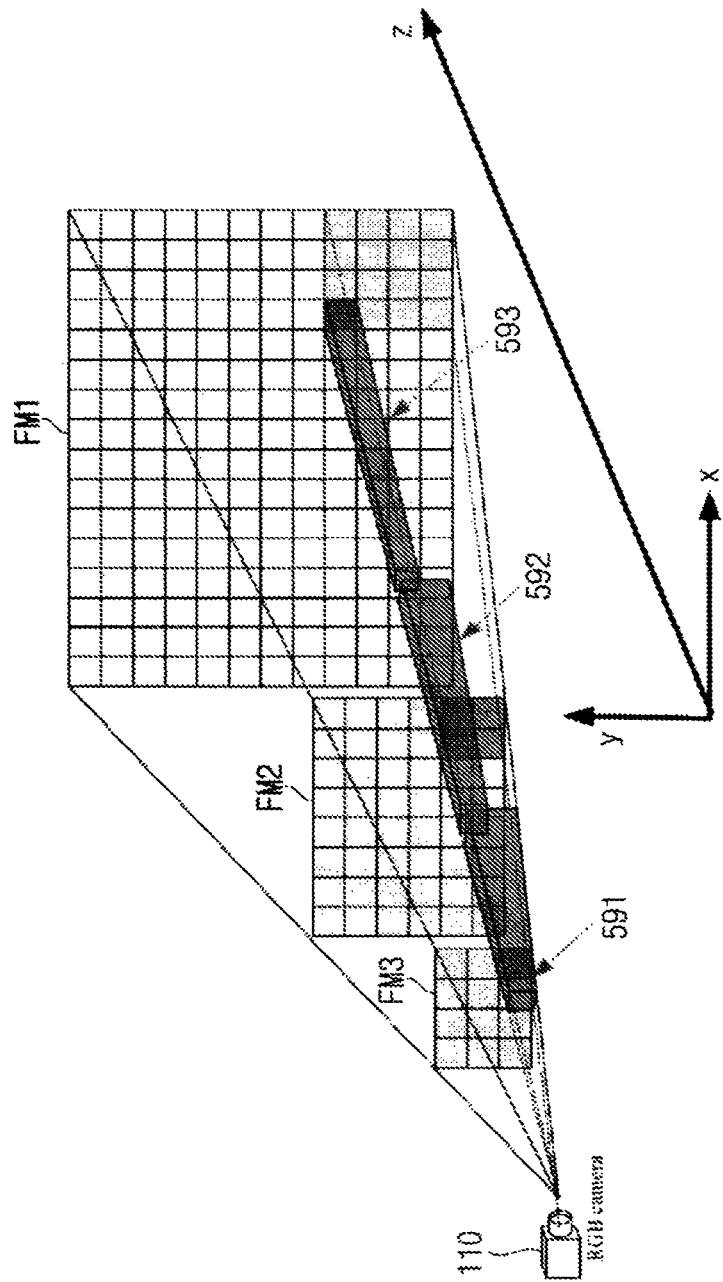
FIG. 23 illustrates examples of the feature maps based on output of the camera in the ADAS according to example embodiments.

FIG. 23 illustrates examples of the feature maps based on output of the camera in the ADAS according to example embodiments.

Referring to FIG. 23, a pixel in each of the feature maps FM1, FM2 and FM3 may cover a region having a different size. Each of reference numerals 591, 592 and 593 may represent a region covered by a pixel in each of the feature maps FM1, FM2 and FM3. Candidates matching the second position information POI2 based on the output of the radar 120 exist in restricted locations, such that regions having a high possibility of the object being present may be searched based on the second position information POI2.

Figure 24:
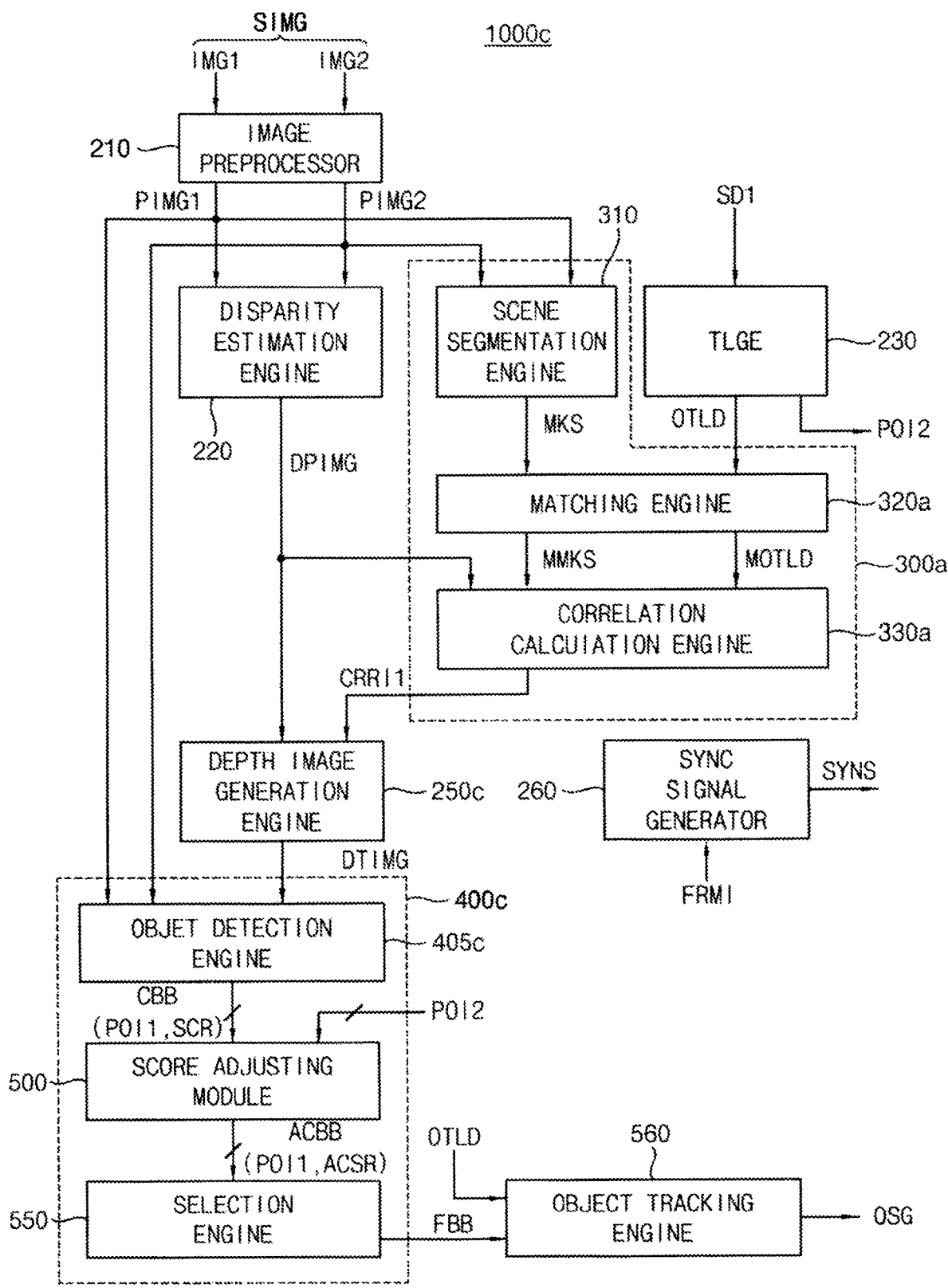
FIG. 24 is a block diagram illustrating another example of the processing circuit in the ADAS in FIG. 2 according to example embodiments.

FIG. 24 is a block diagram illustrating another example of the processing circuit 1000a in the ADAS in FIG. 2 according to example embodiments.

Referring to FIG. 24, a processing circuit 1000c may include an image pre-processor 210, a disparity estimation engine 220, a tracking list generation engine (TLGE) 230, a correlation calculation module 300, a synchronization signal generator 260, a depth image generation engine 250c, an object detector 400c and an object tracking engine 560. The object detector 400c may include an object detection module 405c, a score adjusting module 500 and a selection engine 550.

The image pre-processor 210 may pre-process the stereo image SIMG to output a pre-processed stereo image PSIMG including a first pre-processed viewpoint image PIMG1 and a second pre-processed viewpoint image PIMG2.

The disparity estimation engine 220 may generate a disparity image DPIMG including the disparity information based on the first pre-processed viewpoint image PIMG1 and the second pre-processed viewpoint image PIMG2. The disparity estimation engine 220 may output the disparity image DPIMG including the disparity information by performing stereo matching on the first pre-processed viewpoint image PIMG1 and the second pre-processed viewpoint image PIMG2. The disparity estimation engine 220 may output the disparity image DPIMG based on a difference between pixel values of corresponding pixels of the first pre-processed viewpoint image PIMG1 and the second pre-processed viewpoint image PIMG2.

The tracking list generation engine 230 may generate an object tracking list data OTLD including a second position information POI2 based on the first sensing data SD1 (the reflected signals), may provide the second position information POI2 to the score adjusting module 500 and may provide the object tracking list data OTLD to the object tracking engine 560.

The correlation calculation engine 300*a* may calculate correlation information CRRI based on pre-processed stereo image PSIMG, the object tracking list data OTLD and the disparity image DPIMG including the disparity information, and may provide the correlation information CRRI1 to the depth image generation engine 250*c*.

The correlation calculation engine 300*a* may include a scene segmentation engine 310, a matching engine 320*a* and a correlation calculation engine 330*a*.

The scene segmentation engine 310 may segment the at least one object from at least one of the first pre-processed viewpoint image PIMG1 and the second pre-processed viewpoint image PIMG2 to extract at least one mask MKS. The matching engine 320*a* may perform a matching operation on the at least one mask MKS and the object tracking list data OLTD to output matching results MMKS and MOLTD to the correlation calculation engine 330*a*. The matching results MMKS and MOLTD may include a first matching result MMKS on the mask MKS and a second matching result MOTLD on the object tracking list data OLTD.

The correlation calculation engine 330*a* may receive the matching results MMKS and MOLTD and the disparity image DPIMG including the disparity information, may calculate the correlation information CRRI1 between the depth information and the disparity information based on the matching results MMKS and MOLTD and the disparity information and may provide the correlation information CRRI1 to the depth image generation engine 250*c*.

The depth image generation engine 250*c* may correct depth values of the pre-processed stereo image PSIMG based on the disparity information and the correlation information CRRI1 to generate depth image DTIMG with respect to the pre-processed stereo image PSIMG and may provide the depth image DTIMG to the object detection engine 405*c*.

The object detection module 405*c* may determine regions including at least a portion of the at least one object, respectively, as candidate bounding boxes CBB based on the pre-processed stereo image PSIMG and the position image POIMG and may provide the candidate bounding boxes CBB to the score adjusting module 500. Each of the candidate bounding boxes CBB may include a first position information POI1 and a class score SCR, respectively.

The synchronization signal generator 260 may generate a synchronization signal SYNS based on frame information FRMI. The frame information FRMI may include a first frames per second (FPS) on the stereo image SIMG and/or a second FPS on the object tracking list data OLTD.

The score adjusting module 500 may receive the candidate bounding boxes CBB and the second position information POI2, may adjust selectively a class score of each of the candidate bounding boxes CBB associated with the at least one object based on whether the first position information POI1 of each of the candidate bounding boxes CBB matches the second position information POI2 and based on a comparison of the class score of each of the candidate bounding boxes with the threshold value, and may provide the selection engine 550 with adjusted candidate bounding boxes ACBB. Each of the adjusted candidate bounding boxes ACBB may include an adjusted score ASCR and the first position information POI1.

When the first position information POI1 matches the second position information POI2 and the class score of the candidate bounding box associated with the first position information POI1 matching the second position information POI2, the score adjusting module 500 may adjust a class score of the bounding box such that the class score of the bounding box is equal to or greater than the threshold value.

The selection engine 550 may select a candidate bounding box whose selectively adjusted class score is greatest among the adjusted candidate bounding boxes ACBB as a final bounding box FBB based on the adjusted scores ACSR and may provide the final bounding box FBB to the object tracking engine 560.

The object tracking engine 560 may track the at least one object based on the final bounding box FBB and the object tracking list data OTLD to provide an output signal OSG to a driver of the vehicle 100 through the interface 980 in FIG. 2.

FIG. 25 is an example of an algorithm illustrating that the processing circuit of FIG. 24 calibrates ranges of the camera and the radar based on the class score.

Referring to FIG. 25, when a class score of the candidate bounding box whose first position information matches the second position information is smaller than the threshold value and may use the first position information and the second position information of the candidate bounding box having a high class score as calibration data set as mentioned above.

Figure 26:
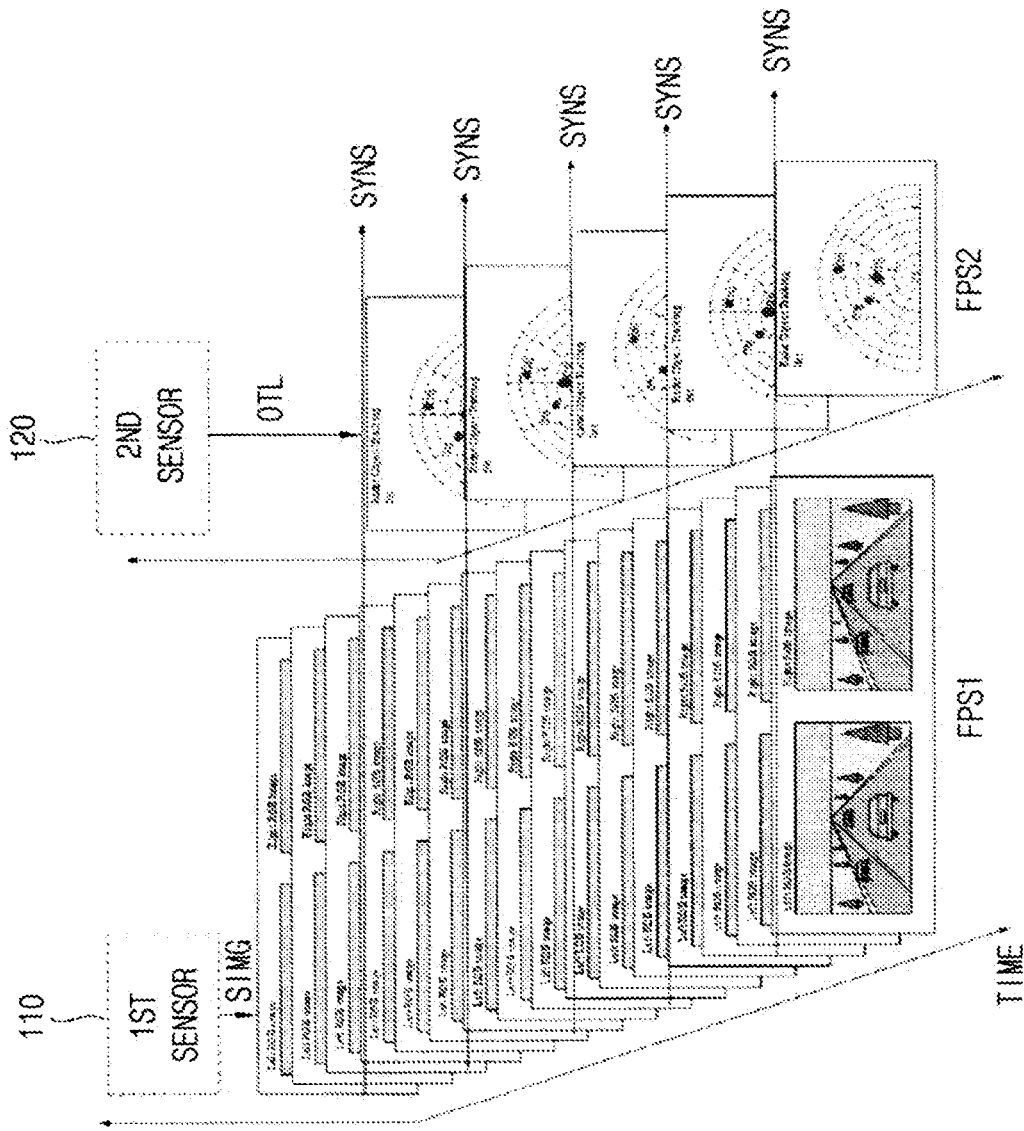
FIG. 26 illustrates an example in which the processing circuit synchronizes the stereo image and the first sensing data.

FIG. 26 illustrates an example in which the processing circuit synchronizes the stereo image and the first sensing data.

Referring to FIG. 26, the first sensor 110 outputs the stereo image SIMG with a first FPS FPS1 and the second sensor 120 outputs the object tracking list OTL with a second FPS FPS2. The first FPS FPS1 is greater than the second FPS FPS2.

For synchronizing images having different FPS, the processing circuit 1000*c* may synchronize the images having different FPS with the synchronization signal SYNS generated in the synchronization signal generator 260.

Accordingly, the processing circuit in the ADAS may adjust selectively a class score of each of the candidate bounding boxes associated with the at least one object based on whether a first position information generated based on output of the camera matches a second position information generated based on output of the radar, and may select a candidate bounding box whose selectively adjusted class score is greatest among the candidate bounding boxes as a final bounding box. Therefore, the processing circuit in the ADAS may reduce a number of candidate bounding boxes which are not selected due to external factors.

Figure 27:
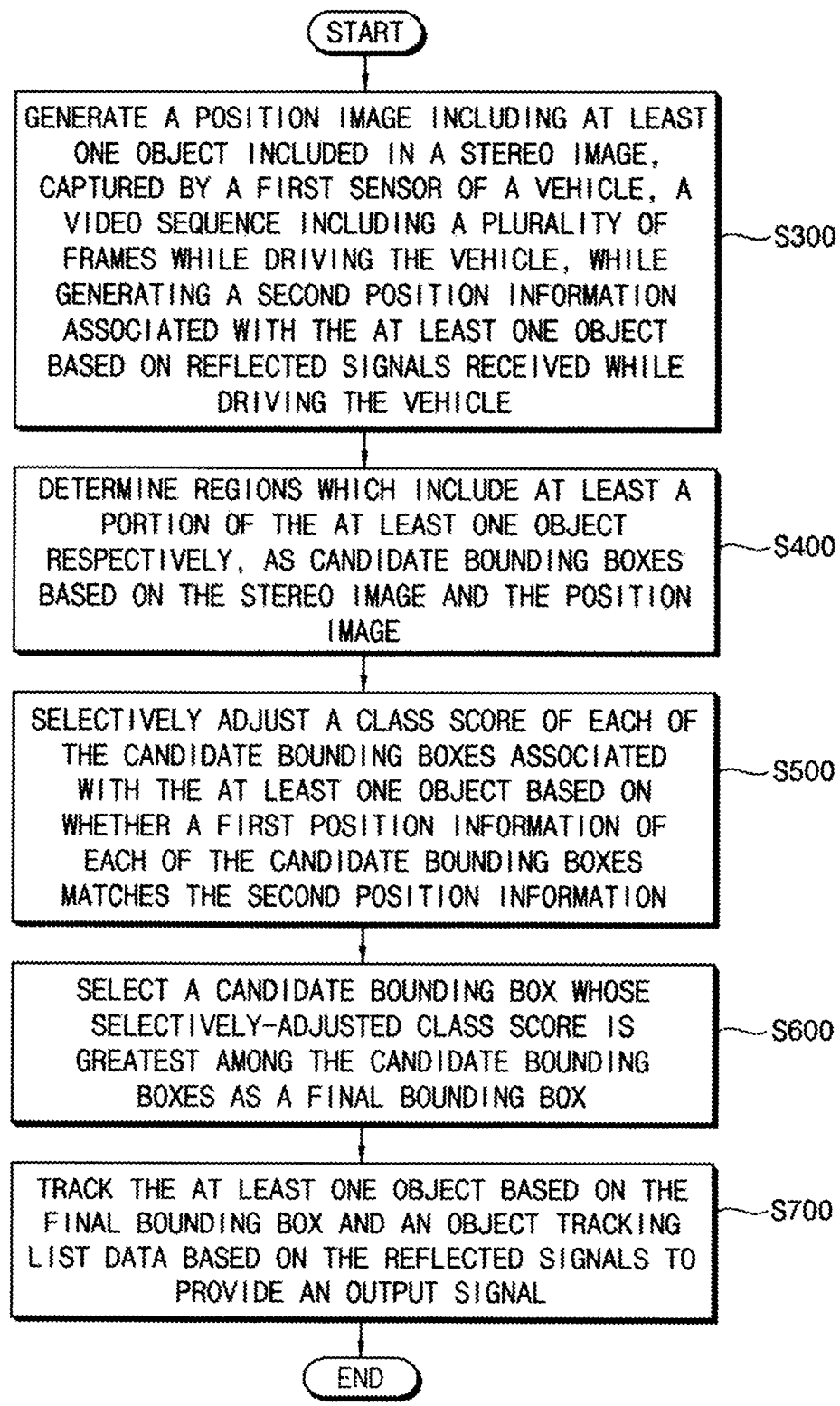
FIG. 27 is a flow chart illustrating a method of detecting an object in the ADAS according to example embodiments.

FIG. 27 is a flow chart illustrating a method of detecting an object in the ADAS according to example embodiments.

Referring to 1 through 27, In operation S300, the ADAS 900*a* may obtain a video sequence (stereo image) including a plurality of frames from, for example, a camera mounted in a vehicle, may obtain reflected signals from at least one sensor mounted in a vehicle and may generate position image on at least one object in the stereo image based on the video sequence and may generate a second position information on the at least one object based on reflected signals received by the radar.

The video sequence may include a series of still images. Each of the still images may refer to a picture or a frame.

In operation S400, the ADAS 900a may determine regions including at least a portion of the at least one object, respectively, as candidate bounding boxes based on the stereo image and the position image Each of the candidate bounding boxes may include a first position information and a class score, respectively.

In operation S500, the ADAS 900a may adjust selectively a class score of each of the candidate bounding boxes associated with the at least one object based on whether the first position information of each of the candidate bounding boxes matches the second position information to provide adjusted scores. According to example embodiments, the ADAS 900a may detect one or more objects from one frame included in the video sequence. The one or more objects detected from the frame may be detected from another frame included in the same video sequence. The one or more objects detected from the frame may not be detected from another frame included in the same video sequence.

According to example embodiments, the ADAS 900a may obtain location information of the object using, for example, an artificial intelligence (AI) learning model. For example, the ADAS 900a may recognize where the first vehicle is located in the first frame based on a bounding box of the first vehicle in the first frame. In addition, the ADAS 900a may recognize a distance between the first vehicle and the third vehicle using the bounding box of the first vehicle and a bounding box of the third vehicle in the first frame. In addition, the ADAS 900a may recognize an amount of change in a distance between the first vehicle and the third vehicle in a third frame using the bounding box of the first vehicle and the bounding box of the third vehicle in the third frame.

According to example embodiments, the ADAS 900a may determine a type of the object. The ADAS 900a may determine whether the object is noise, based on information about an available size of the type of the object in a location in which the object is recognized.

According to example embodiments, the ADAS 900a may use a first trained model in order to detect an object included in a frame and a location of the object. According to example embodiments, the first trained model may be obtained based on a result of learning by detecting the object in a video sequence including the plurality of frames captured during driving of a vehicle and marking the detected object with a bounding box. Thus, when the frames obtained from the video sequence are input in the first trained model, the bounding box designating the object detected from the frames may be output from the first trained model.

In operation S600, the ADAS 900a may select a candidate bounding box whose selectively adjusted class score is greatest among the adjusted candidate bounding boxes as a final bounding box.

In operation S700, the ADAS 900a may determine whether a driving event of a vehicle occurs, by analyzing a sequential change in the bounding boxes of the objects in the plurality of frames. The at least one object may be tracked based on the final bounding box and an object tracking list data based on reflected signals to provide an output signal.

According to example embodiments, the ADAS 900a may analyze the change in the location of the bounding box between a previous frame and a next frame, based on a display order of the video sequence. For example, the ADAS 900a may analyze the change in the location of the bounding box, by comparing location information of the bounding box of an object included in the first frame, which is displayed first, and location information of the bounding box pf the same object included in the second frame, which is displayed next. For example, the ADAS 900a may determine whether an event occurs, by analyzing the change in the location of each of the plurality of objects according to time.

According to example embodiments, the ADAS 900a may determine a type of the event by analyzing the sequential change in the bounding boxes of the objects in the plurality of frames. According to example embodiments, the ADAS 900a may determine a level of risk of driving by analyzing the sequential change in the bounding boxes of the objects in the plurality of frames.

According to example embodiments, the ADAS 900a may use a second trained model to determine whether an event occurs. When an output value related to an object that is output from the first trained model is input in the second trained model, whether an event occurs may be output.

According to example embodiments, the operation of detecting the object, the operation of marking object with the bounding box, and the operation of determining whether an event occurs may be performed using a plurality of trained models.

Figure 28:
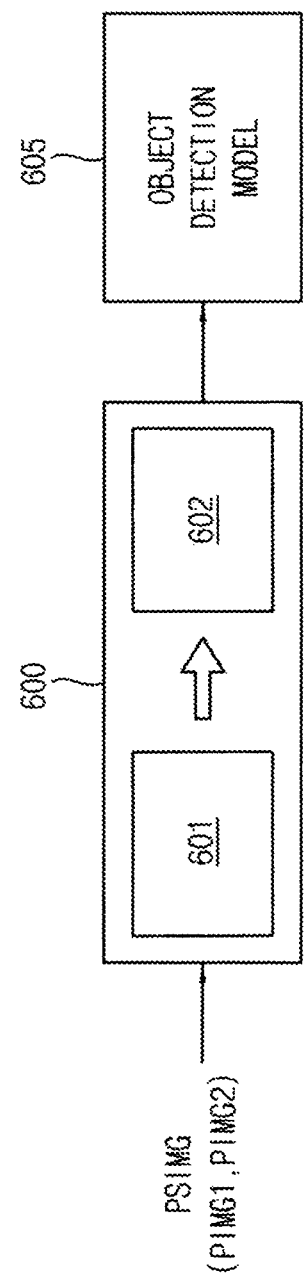
FIG. 28 is a diagram illustrating an operation of generating a trained model which determines whether a driving event of a vehicle occurs, according to example embodiments.

FIG. 28 is a diagram illustrating an operation of generating a trained model which determines whether a driving event of a vehicle occurs, according to example embodiments.

According to example embodiments, event detection model (e.g., including processing circuitry and/or program elements) 605 detects a driving event of a vehicle based on a location of an object. The event detection model 605 may be generated by training a training model 500 including a first trained model (e.g., including processing circuitry and/ or program elements) 601 and a second trained model (e.g., including processing circuitry and/or program elements) 602 using at least one of the first pre-processed viewpoint image PIMG1 and the second pre-processed viewpoint image PIMG2 in the pre-processed stereo image PSIMG.

According to example embodiments, the first trained model 601 may include various processing circuitry and/or program elements and be generated by learning a reference for determining a type of an object and a reference for determining a location of a bounding box of the object in each of a plurality of frames, using, for example, and without limitation, a fully convolutional network (FCN), or the like.

According to example embodiments, the ADAS 900a may input to the first trained model 601 at least one of the first pre-processed viewpoint image PIMG1 and the second pre-processed viewpoint image PIMG2, which includes frames including RGB channels. The first trained model 601 may be trained to detect an object in at least one of the first pre-processed viewpoint image PIMG1 and the second pre-processed viewpoint image PIMG2 and to mark the detected object with a bounding box by using the object detection module 405a, the score adjusting module 500 and the selection engine 550 in FIG. 4, the object detection module 405b, the score adjusting module 500 and the selection engine 550 in FIG. 15 or the object detection module 405c, the score adjusting module 500 and the selection engine 550 in FIG. 24.

In this case, the processing circuit 1000a, 1000b or 1000c may selectively adjust the class scores of the candidate bounding boxes based on the first position information, the second position information and the threshold value and may select at least a portion of the candidate bounding boxes.

The ADAS 900*a* may detect an object in at least one of the first pre-processed viewpoint image PIMG1 and the second pre-processed viewpoint image PIMG2 and may mark the detected object with a bounding box by using the first trained model 601. The ADAS 900*a* may detect objects in one frame and determine a type of each of the objects using the first trained model 501.

The second trained model 602 may be generated by learning a reference for determining whether a driving event of a vehicle occurs by analyzing a sequential change in the bounding box in the plurality of frames, using, for example, and without limitation, at least one of various neural networks. The output of the first trained model 601 may be used as an input of the second trained model 602.

According to other example embodiments, the ADAS 900*a* may use a matrix generated by reducing a dimension of the matrix output from the first trained model, as the input of the second trained model, in order to reduce the amount of operations of the second trained model 602 which determines whether an event occurs. For example, dilated convolution, or the like, may be used to reduce the dimension of the matrix.

According to example embodiments, the processing circuit 1000*a*, 1000*b*, or 1000*c* may obtain a first trained model based on a result of detecting a learning object from a video sequence including a plurality of learning frames captured while driving a learning vehicle, may detect the at least one object in the stereo image by using the obtained first trained model, determine the detected object as candidate bounding boxes, may selectively adjust the class scores of the candidate bounding boxes based on the first position information and the second position information and may mark at least one selected from the candidate bounding boxes as a final bounding box.

Figure 29:
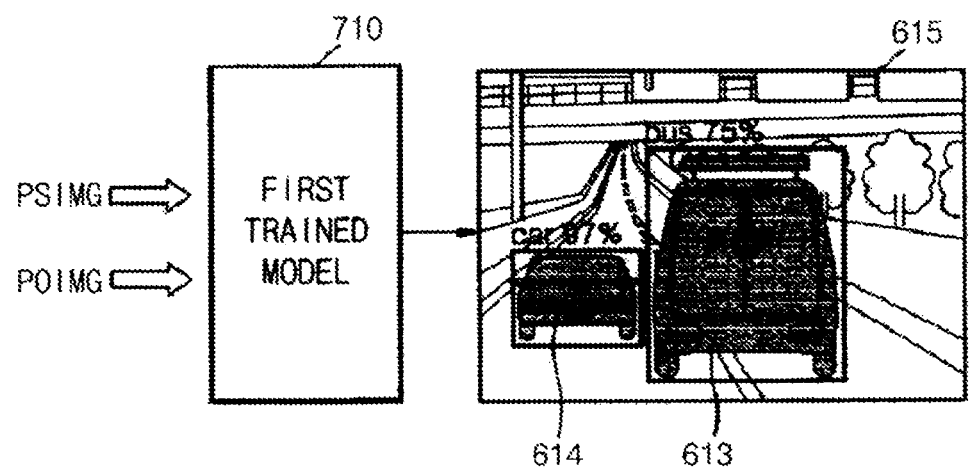
FIG. 29 is a diagram illustrating an example of detecting an object using a first trained model according to example embodiments.

FIG. 29 is a diagram illustrating an example of detecting an object using a first trained model according to example embodiments.

Referring to FIG. 29, the ADAS 900*a* may detect an object in a frame and may mark the detected object with a bounding box using a first trained model 710 learned using, as an input value, a pre-processed stereo image PSIMG including a plurality of frames obtained during driving of a vehicle (i.e., when the vehicle is in motion).

According to example embodiments, since the first trained model 710 may use FCN, the ADAS 900*a* may output a type of the object and the bounding box when the pre-processed stereo image PSIMG is input to the first trained model 710.

According to example embodiments, when a series of matrices output from the first trained model 710 are generated into an image, a video sequence 615 in which objects included in the video sequence 615 are indicated in different colors based on types thereof may be obtained. For example, a road forming a constant pattern and a vehicle that is a moving object may be indicated in different colors.

According to example embodiments, the ADAS 900*a* may detect a type of the object and a level of accuracy of object recognition. For example, the ADAS 900*a* may determine types and locations of a first object 613 and a second object 614 in the video sequence 615 output from the first trained model 710. The ADAS 900*a* may recognize with a level of accuracy of 75% that the first object 613 is a bus using information about a shape and a location of the first object 613, and recognize with a level of accuracy of 97% that the second object 614 is a car using information about a shape and a location of the second object 614.

Figure 30:
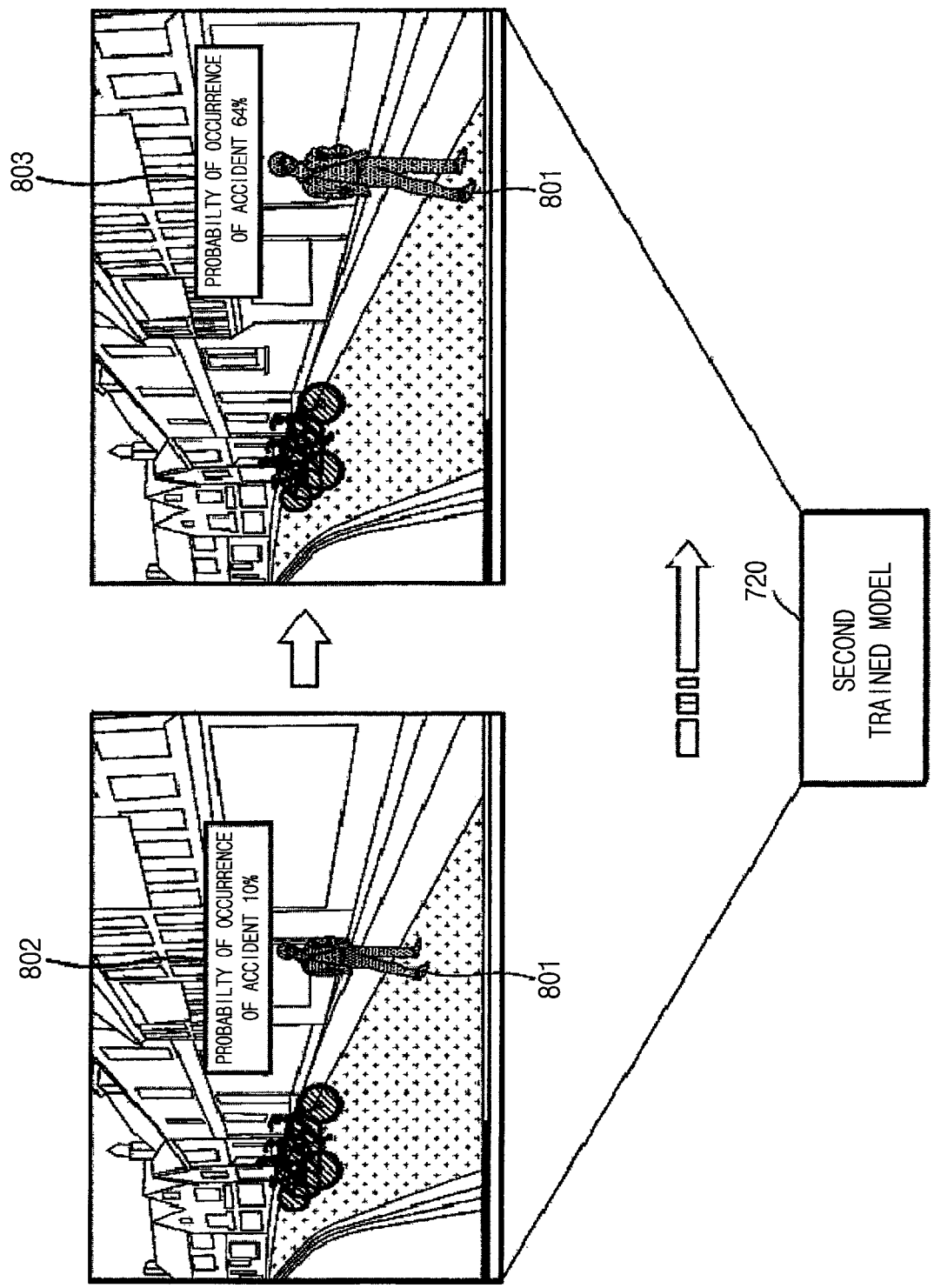
FIG. 30 is a diagram illustrating an example of determining whether an event occurs based on sequential movement of an object using a second trained model according to example embodiments.

FIG. 30 is a diagram illustrating an example of determining whether an event occurs based on sequential movement of an object using a second trained model according to example embodiments.

According to example embodiments, when frames including the object including the location information, output from the first trained model 710, are input in the second trained model 720, it may be determined whether an event related to the object occurs.

According to example embodiments, the second trained model 720 may use, for example, and without limitation, an recursive neural network (RNN), which may refer, for example, to a neural network in which nodes are recurrently connected to one another in different temporal sections. The RNN may recognize sequential data.

The RNN may be trained via supervised learning in which learning data and output data corresponding thereto are input in the neural network and connection weights of connecting lines are modified and refined so that the output data corresponding to the learning data is output. For example, the RNN may modify and refine the connection weights between neurons based on a delta rule and back propagation learning.

For example, the second trained model 720 may recognize a bounding box marking an object 801, which is located closer to the driving vehicle in the next frame than in the previous frame, and may determine that collision between an object 801 and the driving vehicle occurs.

According to some embodiments, the second trained model 720 may predict a probability of occurrence of an event based on an object, by analyzing a sequential change in a bounding box of the object. For example, the second trained model 720 may determine a probability of occurrence of an accident based on a distance between the object 801 and a vehicle, the distance being determined based on the location of the object 801. According to example embodiments, when the second trained model 720 determines that the distance between the object 801 and the vehicle is great, the second trained model 720 may determine that the probability of the occurrence of the accident is 10% as described in operation 802. When the second trained model 720 determines that the distance between the vehicle and the object 801 has decreased as the vehicle and the object 801 move according to time, the second trained model 720 may determine that the probability of the occurrence of the accident is 64% as described in operation 803. According to example embodiments, the probability of the occurrence of the accident based on the movement of the vehicle and the object 801 according to time may be learned by the second trained model 820.

According to example embodiments, the processing circuit 1000*a*, 1000*b*, 1000*c* may obtain a second trained model based on a result of learning whether a driving event of a learning vehicle occurs based on a sequential change with respect to a bounding box indicating an object in a plurality of learning frames, and may determine whether the driving event of the vehicle with respect to the object occurs using the obtained second trained model.

Example embodiments may be employed in ADAS which detects an object based on artificial neural network or in automatic driving device.

The foregoing is illustrative of example embodiments and is not to be construed as limiting thereof. Although some example embodiments have been described, those skilled in the art will readily appreciate that many modifications are possible in the example embodiments without materially departing from the novel teachings and advantages of the present disclosure. Accordingly, all such modifications are intended to be included within the scope of the present disclosure as defined in the claims.

What is claimed is:

1. An advanced driver assist system (ADAS), comprising:
a processing circuit; and
a memory configured to store instructions executable by the processing circuit,
wherein the processing circuit is configured to execute the instructions to cause the ADAS to perform operations comprising:
generating an event detection model by training a trained model including a first trained model and a second trained model based on a stereo image including at least one object;
generating a position information associated with the at least one object based on reflected signals by using the first trained model;
determining regions, each comprising at least a portion of the at least one object, as candidate bounding boxes based on the stereo image by using the first trained model; and
selectively adjusting class scores of the candidate bounding boxes associated with the at least one object based on the position information by using the first trained model.

2. The ADAS of claim 1, wherein the processing circuit is further configured to execute the instructions to cause the ADAS to generate the first trained model by learning a first reference for determining a type of the at least one object and a second reference for determining a location of a bounding box of the at least one object in each of a plurality of frames of the stereo image.

3. The ADAS of claim 2, wherein the first trained model is configured to learn the first reference and the second reference by using a fully convolutional network.

4. The ADAS of claim 2, wherein the processing circuit is configured to train the first trained model by performing operations comprising:
inputting at least one of a first view point image and a second view point image of the stereo image; and
detecting a target object in the at least one of the first view point image and the second view point image to mark the target object that was detected with a bounding box.

5. The ADAS of claim 1, wherein the processing circuit is further configured to execute the instructions to cause the ADAS to generate the second trained model by performing operations comprising:
learning a reference for determining whether a driving event of a vehicle occurs by analyzing a sequential change in a bounding box in a plurality of frames of the stereo image.

6. The ADAS of claim 5, wherein the second trained model is configured to learn the reference by using a neural network.

7. The ADAS of claim 5, wherein the second trained model is configured to use as an input, a matrix generated by reducing a dimension of a matrix output from the first trained model.

8. The ADAS of claim 1,
wherein the stereo image comprises a first viewpoint image and a second viewpoint image,
wherein the reflected signals are received from a vehicle that is in motion, and
wherein the processing circuit is further configured to execute the instructions to cause the ADAS to select a final bounding box whose class score is greatest among the selectively adjusted class scores of the candidate bounding boxes.

9. The ADAS of claim 8, wherein the processing circuit is further configured to execute the instructions to cause the ADAS to track the at least one object based on the final bounding box and an object tracking list data that is generated based on the reflected signals to generate an output signal.

10. The ADAS of claim 1, wherein each of the candidate bounding boxes comprises a respective first position information, a respective class score, and a respective size information associated with a corresponding bounding box among the candidate bounding boxes.

11. The ADAS of claim 10,
wherein the stereo image comprises a first object and a second object,
wherein the first object is associated with a first class score greater than a threshold value and a first sub position information,
wherein the second object is associated with a second class score less than the threshold value and a second sub position information,
wherein the first sub position information and the second sub position information are associated with the first sub position information,
wherein the first object is associated with a third sub position information, and the second object is associated with a fourth sub position information,
wherein the third sub position information and the fourth sub position information are associated with the position information, and
wherein when the second sub position information matches the fourth sub position information, the processing circuit is further configured to execute the instructions to cause the ADAS to adjust the second class score such that the second class score is equal to or greater than the threshold value.

12. The ADAS of claim 1, wherein the processing circuit is further configured to execute the instructions to cause the ADAS to determine the candidate bounding boxes associated with the at least one object by using at least one of a single shot detector (SSD) or a faster recurrent convolution neural network (R-CNN).

13. The ADAS of claim 1, wherein the processing circuit is further configured to execute the instructions to cause the ADAS to performing operations comprising:
extracting features of the at least one object from the stereo image to generate first feature vectors;
extracting features of the at least one object from a position image to generate second feature vectors, wherein the position image is generated based on the stereo image;
merging the first feature vectors and the second feature vectors to generate merge feature vectors;
generating feature maps on the at least one object based on the merge feature vectors; and
determining the candidate bounding boxes associated with the at least one object based on the feature maps.

14. The ADAS of claim 1, wherein the processing circuit is further configured to execute the instructions to cause the ADAS to performing operations comprising:
generating a depth image on the at least one object based on the reflected signals; and determining the candidate bounding boxes associated with the at least one object further based on the depth image.

15. The ADAS of claim 1, wherein the processing circuit comprises:
a position information generation engine configured to generate a position image based on the stereo image;
a tracking list generation engine configured to generate an object tracking list data comprising the position information based on the reflected signals;
an object detector configured to output a final bounding box of the candidate bounding boxes indicating the at least one object based on the stereo image, the position image, and the position information; and
an object tracking engine configured to track the at least one object based on the final bounding box and the object tracking list data to generate an output signal,
wherein the object detector comprises:
an object detection module configured to generate the candidate bounding boxes associated with the at least one object based on the stereo image and the position image;
a score adjusting module configured to selectively adjust the class scores of respective ones of the candidate bounding boxes based on a respective first position information, the position information, and a comparison of respective ones of the class scores with a threshold value to generate respective adjusted candidate bounding boxes comprising adjusted scores; and
a selection engine configured to select an adjusted candidate bounding box whose adjusted score is greatest among the adjusted scores of the adjusted candidate bounding boxes as the final bounding box.

16. An advanced driver assist system (ADAS) in a vehicle, the ADAS comprising:
a pre-processor configured to generate a stereo image including at least one object, based on a video sequence comprising a plurality of frames;
a tracking list generation engine configured to generate a position information associated with the at least one object based on reflected signals; and
an object detector configured to train a trained model including a first trained model and a second trained model based on an input image, determine regions, each comprising at least a portion of the at least one object, as candidate bounding boxes based on the stereo image by using the first trained model, and selectively adjust class scores of the candidate bounding boxes associated with the at least one object based on the position information by using the first trained model.

17. The ADAS of claim 16, wherein the object detector is further configured to select a final bounding box whose class score is greatest among the selectively adjusted class scores of the candidate bounding boxes by using the first trained model.

18. The ADAS of claim 17, further comprising:
a position information generation engine configured to generate a position image based on the stereo image; and
an object tracking engine configured to track the at least one object based on the final bounding box and an object tracking list data to generate an output signal by using the second trained model,
wherein the tracking list generation engine is configured to generate the object tracking list data comprising the position information based on the reflected signals, and
wherein the object detector is configured to selectively adjust the class scores of the candidate bounding boxes based on whether a respective first position information of the candidate bounding boxes matches the position information.

19. A method of detecting an object in an advanced driver assist system (ADAS), the method comprising:
generating an event detection model by training a trained model including a first trained model and a second trained model based on a stereo image including at least one object,
generating a position information associated with the at least one object based on reflected signals by using the first trained model;
determining regions, each comprising at least a portion of the at least one object, as candidate bounding boxes based on the stereo image by using the first trained model; and
selectively adjusting class scores of the candidate bounding boxes associated with the at least one object based on the position information by using the first trained model.

20. The method of claim 19, further comprising:
selecting a candidate bounding box whose class score that was selectively adjusted is greatest among the class scores of the candidate bounding boxes as a final bounding box by using the first trained model; and
tracking the at least one object based on the final bounding box and an object tracking list data based on the reflected signals to generate an output signal by using the second trained model.

* * * * *